(12) United States Patent
Naitou

(10) Patent No.: US 8,219,903 B2
(45) Date of Patent: Jul. 10, 2012

(54) DISPLAY INFORMATION VERIFICATION PROGRAM, METHOD AND APPARATUS

(75) Inventor: Masaya Naitou, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1014 days.

(21) Appl. No.: 12/164,717

(22) Filed: Jun. 30, 2008

(65) Prior Publication Data

US 2008/0270765 A1    Oct. 30, 2008

Related U.S. Application Data

(63) Continuation of application No. PCT/JP2006/300692, filed on Jan. 19, 2006.

(51) Int. Cl.
*G06F 17/00* (2006.01)
*G06F 9/44* (2006.01)

(52) U.S. Cl. ........ 715/236; 715/234; 715/249; 715/273; 717/115; 717/126; 705/14.18; 705/35

(58) Field of Classification Search .............. 715/205, 715/209, 210, 212, 213, 226, 233, 234, 236, 715/273, 274, 700, 762, 763, 825, 200, 201, 715/202, 204, 239, 249, 253, 254, 255, 256, 715/731, 744, 746, 749, 760; 717/100, 105, 717/106, 108, 110, 113, 114, 115, 126, 136, 717/137, 162; 705/14.17, 14.19, 14.25, 14.27, 705/14.28, 14.29, 14.54, 348, 35, 404
See application file for complete search history.

(56) References Cited

U.S. PATENT DOCUMENTS

| | | | |
|---|---|---|---|
| 6,968,316 B1 * | 11/2005 | Hamilton | 705/36 R |
| 7,778,842 B2 * | 8/2010 | Apple et al. | 705/1.1 |
| 7,813,975 B2 | 10/2010 | Takahashi et al. | |
| 2002/0111891 A1 * | 8/2002 | Hoffman et al. | 705/36 |
| 2003/0033212 A1 * | 2/2003 | Sandhu et al. | 705/26 |
| 2003/0097637 A1 | 5/2003 | Tozawa et al. | |
| 2003/0198850 A1 | 10/2003 | Suzuki et al. | |
| 2006/0041492 A1 * | 2/2006 | Takahashi et al. | 705/35 |
| 2006/0095360 A1 * | 5/2006 | Apple et al. | 705/35 |
| 2009/0006985 A1 * | 1/2009 | Fong et al. | 715/760 |

FOREIGN PATENT DOCUMENTS

| | | |
|---|---|---|
| JP | 01-191941 | 8/1989 |
| JP | A 2002-352075 | 12/2002 |
| JP | A 2003-85016 | 3/2003 |
| JP | 2004-303052 | 10/2004 |
| JP | A 2004-334253 | 11/2004 |
| JP | 2005-043932 | 2/2005 |
| JP | A 2005-242910 | 9/2005 |

* cited by examiner

*Primary Examiner* — Maikhanh Nguyen

(74) *Attorney, Agent, or Firm* — Fujitsu Patent Center

(57) ABSTRACT

A display information verification method, when display data of financial data is generated from the financial data and scripts for the financial data, includes: searching the scripts for an arithmetic instruction to process a numeric value in the financial data or a conversion instruction to convert a character string included in the financial data; and judging whether or not the arithmetic instruction or the conversion instruction detected in the searching is an instruction considered to manipulate the financial data. Thus, it is possible to detect the instruction considered to manipulate data from the scripts, and to avoid display including the manipulation of the data. In addition, for example, by using information of the instruction, which is stored inside in advance and is allowed to be used, it is possible to detect only the arithmetic instruction or the conversion instruction, which is not allowed to be used.

4 Claims, 28 Drawing Sheets

```
<?xml version="1.0" encoding="US-ASCII"?>
<!-- Generated by F XWand 7.1.0041 -->
<linkbase xmlns="http://www.xbrl.org/2003/linkbase" xmlns:xbrli="http://www.xbrl.org/2003/
instance" xmlns:xlink="http://www.w3.org/1999/xlink" xmlns:target_ns="http://
www.f******.com/2002-11-11" xmlns:iso4217="http://www.xbrl.org/2003/iso4217">
  <presentationLink xlink:type="extended" xlink:role="http://www.xbrl.org/2003/role/link">
    <loc xlink:type="locator"
xlink:href="taxonomy.xsd#consolidatedBusinessResultsAndFinancialPositions.consolidatedResul
tsOfOperations"
xlink:label="consolidatedBusinessResultsAndFinancialPositions.consolidatedResultsOfOperation
s"
xlink:title="consolidatedBusinessResultsAndFinancialPositions.consolidatedResultsOfOperations
"/>
    <loc xlink:type="locator" xlink:href="taxonomy.xsd#consolidatedResultsOfOperations.sales"
xlink:label="consolidatedResultsOfOperations.sales"
xlink:title="consolidatedResultsOfOperations.sales"/>
    <presentationArc xlink:type="arc" xlink:arcrole="http://www.xbrl.org/2003/arcrole/parent-child"
xlink:from="consolidatedBusinessResultsAndFinancialPositions.consolidatedResultsOfOperation
s" xlink:to="consolidatedResultsOfOperations.sales" xlink:title="presentation:
consolidatedBusinessResultsAndFinancialPositions.consolidatedResultsOfOperations to
consolidatedResultsOfOperations.sales" order="1.0"/>
    <loc xlink:type="locator"
xlink:href="taxonomy.xsd#consolidatedResultsOfOperations.operatingIncome"
xlink:label="consolidatedResultsOfOperations.operatingIncome"
xlink:title="consolidatedResultsOfOperations.operatingIncome"/>
    <presentationArc xlink:type="arc" xlink:arcrole="http://www.xbrl.org/2003/arcrole/parent-child"
xlink:from="consolidatedBusinessResultsAndFinancialPositions.consolidatedResultsOfOperation
s" xlink:to="consolidatedResultsOfOperations.operatingIncome" xlink:title="presentation:
consolidatedBusinessResultsAndFinancialPositions.consolidatedResultsOfOperations to
consolidatedResultsOfOperations.operatingIncome" order="3.0"/>
  </presentationLink>
</linkbase>
```

FIG.4

```
<?xml version="1.0" encoding="US-ASCII"?>
<!-- Generated by F XWand 7.1.0041 -->
<linkbase xmlns="http://www.xbrl.org/2003/linkbase" xmlns:xbrli="http://www.xbrl.org/
2003/instance" xmlns:xlink="http://www.w3.org/1999/xlink" xmlns:target_ns="http://
www.f*****.com/2002-11-11" xmlns:iso4217="http://www.xbrl.org/2003/iso4217">
  <labelLink xlink:type="extended" xlink:role="http://www.xbrl.org/2003/role/link">
    <loc xlink:type="locator"
xlink:href="taxonomy.xsd#consolidatedResultsOfOperations.operatingIncome"
xlink:label="consolidatedResultsOfOperations.operatingIncome"
xlink:title="consolidatedResultsOfOperations.operatingIncome"/>
    <label xlink:type="resource"
xlink:label="label_consolidatedResultsOfOperations.operatingIncome_ja"
xlink:role="http://www.xbrl.org/2003/role/label"
xlink:title="label_consolidatedResultsOfOperations.operatingIncome_ja"
xml:lang="ja">営業利益</label>
    <labelArc xlink:type="arc" xlink:arcrole="http://www.xbrl.org/2003/arcrole/concept-
label" xlink:from="consolidatedResultsOfOperations.operatingIncome"
xlink:to="label_consolidatedResultsOfOperations.operatingIncome_ja" xlink:title="label:
consolidatedResultsOfOperations.operatingIncome to
label_consolidatedResultsOfOperations.operatingIncome_ja" order="1.0"/>
    <label xlink:type="resource"
xlink:label="label_consolidatedResultsOfOperations.operatingIncome_en"
xlink:role="http://www.xbrl.org/2003/role/label"
xlink:title="label_consolidatedResultsOfOperations.operatingIncome_en"
xml:lang="en">Operating income</label>
    <labelArc xlink:type="arc" xlink:arcrole="http://www.xbrl.org/2003/arcrole/concept-
label" xlink:from="consolidatedResultsOfOperations.operatingIncome"
xlink:to="label_consolidatedResultsOfOperations.operatingIncome_en" xlink:title="label:
consolidatedResultsOfOperations.operatingIncome to
label_consolidatedResultsOfOperations.operatingIncome_en" order="1.0"/>
    <loc xlink:type="locator"
xlink:href="taxonomy.xsd#consolidatedBusinessResultsAndFinancialPositions.consolidat
edResultsOfOperations"
xlink:label="consolidatedBusinessResultsAndFinancialPositions.consolidatedResultsOfOp
erations"
xlink:title="consolidatedBusinessResultsAndFinancialPositions.consolidatedResultsOfOp
erations"/>
    <label xlink:type="resource"
xlink:label="label_consolidatedBusinessResultsAndFinancialPositions.consolidatedResult
sOfOperations_ja" xlink:role="http://www.xbrl.org/2003/role/label"
xlink:title="label_consolidatedBusinessResultsAndFinancialPositions.consolidatedResults
OfOperations_ja" xml:lang="ja">経営成績</label>
    <labelArc xlink:type="arc" xlink:arcrole="http://www.xbrl.org/2003/arcrole/concept-
label"
xlink:from="consolidatedBusinessResultsAndFinancialPositions.consolidatedResultsOfOp
erations"
xlink:to="label_consolidatedBusinessResultsAndFinancialPositions.consolidatedResultsO
fOperations_ja" xlink:title="label:
consolidatedBusinessResultsAndFinancialPositions.consolidatedResultsOfOperations to
label_consolidatedBusinessResultsAndFinancialPositions.consolidatedResultsOfOperatio
ns_ja" order="1.0"/>
```

FIG.5

```
<label xlink:type="resource"
xlink:label="label_consolidatedBusinessResultsAndFinancialPositions.consolidatedResult
sOfOperations_en" xlink:role="http://www.xbrl.org/2003/role/label"
xlink:title="label_consolidatedBusinessResultsAndFinancialPositions.consolidatedResults
OfOperations_en" xml:lang="en">Results of operations</label> <labelArc
xlink:type="arc" xlink:arcrole="http://www.xbrl.org/2003/arcrole/concept-label"
xlink:from="consolidatedBusinessResultsAndFinancialPositions.consolidatedResultsOfOp
erations"
xlink:to="label_consolidatedBusinessResultsAndFinancialPositions.consolidatedResultsO
fOperations_en" xlink:title="label:
consolidatedBusinessResultsAndFinancialPositions.consolidatedResultsOfOperations to
label_consolidatedBusinessResultsAndFinancialPositions.consolidatedResultsOfOperatio
ns_en" order="1.0"/>
   <loc xlink:type="locator"
xlink:href="taxonomy.xsd#consolidatedResultsOfOperations.sales"
xlink:label="consolidatedResultsOfOperations.sales"
xlink:title="consolidatedResultsOfOperations.sales"/>
   <label xlink:type="resource"
xlink:label="label_consolidatedResultsOfOperations.sales_ja" xlink:role="http://
www.xbrl.org/2003/role/label" xlink:title="label_consolidatedResultsOfOperations.sales_ja"
xml:lang="ja">売上高</label>
   <labelArc xlink:type="arc" xlink:arcrole="http://www.xbrl.org/2003/arcrole/concept-
label" xlink:from="consolidatedResultsOfOperations.sales"
xlink:to="label_consolidatedResultsOfOperations.sales_ja" xlink:title="label:
consolidatedResultsOfOperations.sales to
label_consolidatedResultsOfOperations.sales_ja" order="1.0"/>
   <label xlink:type="resource"
xlink:label="label_consolidatedResultsOfOperations.sales_en" xlink:role="http://
www.xbrl.org/2003/role/label"
xlink:title="label_consolidatedResultsOfOperations.sales_en" xml:lang="en">Sales</
label>
   <labelArc xlink:type="arc" xlink:arcrole="http://www.xbrl.org/2003/arcrole/concept-
label" xlink:from="consolidatedResultsOfOperations.sales"
xlink:to="label_consolidatedResultsOfOperations.sales_en" xlink:title="label:
consolidatedResultsOfOperations.sales to
label_consolidatedResultsOfOperations.sales_en" order="1.0"/>
  </labelLink>
</linkbase>
```
— 601

FIG.6

```
<?xml version="1.0"?>
<xsl:stylesheet version="1.0" xmlns:xbrli="http://www.xbrl.org/2003/instance"
xmlns:xbrll="http://www.xbrl.org/2003/linkbase" xmlns:xsl="http://www.w3.org/1999/XSL/
Transform" xmlns:xsi="http://www.w3.org/2001/XMLSchema-instance" xmlns:xlink="http://
www.w3.org/1999/xlink" xmlns:p0="http://www.f******.com/2002-11-11">

<xsl:output method="html" encoding="Shift_JIS"/>

<xsl:template match="/">
<html>
<body>
<div class="pagelabel">MANAGEMENT RESULT</div>

<table>

<tr>
<th></th>
<th>2004</th>
<th>2003</th>
</tr>

<tr>
<td>SALES</td>
<td><xsl:value-of select="/xbrli:xbrl/p0:consolidatedResultsOfOperations.sales[(@contextRef
= 'X02') and (@unitRef = 'U1')]"/>YEN</td>
<td><xsl:value-of select="/xbrli:xbrl/p0:consolidatedResultsOfOperations.sales[(@contextRef
= 'X01') and (@unitRef = 'U1')]"/>YEN</td>
</tr>

<tr>
<td>OPERATING PROFIT</td>
<td><xsl:value-of select="/xbrli:xbrl/
p0:consolidatedResultsOfOperations.operatingIncome[(@contextRef = 'X02') and (@unitRef =
'U1')]"/>YEN</td>
<td><xsl:value-of select="/xbrli:xbrl/
p0:consolidatedResultsOfOperations.operatingIncome[(@contextRef = 'X01') and (@unitRef =
'U1')]"/>YEN</td>
</tr>

</table>

</body>
</html>
</xsl:template>
</xsl:stylesheet>
```

FIG.7

MANAGEMENT RESULT

|  | 2004 | 2003 |
|---|---|---|
| SALES | 40000YEN | 30000YEN |
| OPERATING PROFIT | 15000YEN | 20000YEN |

```
<?xml version="1.0"?>
<xsl:stylesheet version="1.0" xmlns:xbrli="http://www.xbrl.org/2003/instance"
xmlns:xbrll="http://www.xbrl.org/2003/linkbase" xmlns:xsl="http://www.w3.org/1999/XSL/
Transform" xmlns:xsi="http://www.w3.org/2001/XMLSchema-instance" xmlns:xlink="http://
www.w3.org/1999/xlink" xmlns:p0="http://www.f******.com/2002-11-11">

<xsl:output method="html" encoding="Shift_JIS"/>

<xsl:template match="/">
<html>
<body>
<div class="pagelabel">MANAGEMENT RESULT</div>

<table>

<tr>
<th></th>
<th>2004</th>
<th>2003</th>
</tr>

<tr>
<td>SALES</td>
<td><xsl:value-of select="/xbrli:xbrl/
p0:consolidatedResultsOfOperations.sales[(@contextRef = 'X02') and (@unitRef =
'U1')]"/>YEN</td>
<td><xsl:value-of select="/xbrli:xbrl/
p0:consolidatedResultsOfOperations.sales[(@contextRef = 'X01') and (@unitRef =
'U1')]"/>YEN</td>
</tr>
</table>

</body>
</html>
</xsl:template>
</xsl:stylesheet>
```

MANAGEMENT RESULT

|  | 2004 | 2003 |
|---|---|---|
| SALES | 40000YEN | 30000YEN |

FIG.12B

MANAGEMENT RESULT

|  | 2004 | 2003 |
|---|---|---|
| SALES | 40000YEN | 30000YEN |
| OPERATING PROFIT | 15000YEN | 20000YEN |
| CURRENT TERM NET PROFIT | 13000YEN | 15000YEN |

FIG.12C

MANAGEMENT RESULT

|  | 2004 | 2003 |
|---|---|---|
| SALES | 40000YEN | 30000YEN |
| OPERATING PROFIT | 30000YEN | 20000YEN |

FIG.12D

MANAGEMENT RESULT

|  | 2004 | 2003 |
|---|---|---|
| SALES | 40000YEN | 30000YEN |

OPERATING PROFIT 15000YEN, 20000YEN

FIG.12E

MANAGEMENT RESULT

|  | 2004 | 2003 |
|---|---|---|
| SALES | 40000YEN | 30000YEN |
| OPERATING PROFIT |  |  |

```
<?xml version="1.0"?>
<xsl:stylesheet version="1.0" xmlns:xbrli="http://www.xbrl.org/2003/instance"
xmlns:xbrll="http://www.xbrl.org/2003/linkbase" xmlns:xsl="http://www.w3.org/1999/XSL/
Transform" xmlns:xsi="http://www.w3.org/2001/XMLSchema-instance" xmlns:xlink="http://
www.w3.org/1999/xlink" xmlns:p0="http://www.f*****.com/2002-11-11">

<xsl:output method="html" encoding="Shift_JIS"/>

<xsl:template match="/">
<html>
<body>
<div class="pagelabel">MANAGEMENT RESULT</div>

<table>

<tr>
<th></th>
<th>2004</th>
<th>2003</th>
</tr>

<tr>
<td>SALES</td>
<td><xsl:value-of select="/xbrli:xbrl/p0:consolidatedResultsOfOperations.sales[(@contextRef
= 'X02') and (@unitRef = 'U1')]"/>YEN</td>
<td><xsl:value-of select="/xbrli:xbrl/p0:consolidatedResultsOfOperations.sales[(@contextRef
= 'X01') and (@unitRef = 'U1')]"/>YEN</td>
</tr>

<tr>
<td>OPERATING PROFIT</td>
<td><xsl:value-of select="/xbrli:xbrl/
p0:consolidatedResultsOfOperations.operatingIncome[(@contextRef = 'X02') and (@unitRef =
'U1')]"/>YEN</td>
<td><xsl:value-of select="/xbrli:xbrl/
p0:consolidatedResultsOfOperations.operatingIncome[(@contextRef = 'X01') and (@unitRef =
'U1')]"/>YEN</td>
</tr>

<tr>
<td>CURRENT TERM NET PROFIT</td>        ⎫
<td>13000YEN</td>                        ⎬ ~1401
<td>15000YEN</td>                        ⎪
</tr>                                    ⎭

</table>

</body>
</html>
</xsl:template>
</xsl:stylesheet>
```

FIG.14

```
<?xml version="1.0"?>
<xsl:stylesheet version="1.0" xmlns:xbrli="http://www.xbrl.org/2003/instance"
xmlns:xbrll="http://www.xbrl.org/2003/linkbase" xmlns:xsl="http://www.w3.org/1999/XSL/
Transform" xmlns:xsi="http://www.w3.org/2001/XMLSchema-instance" xmlns:xlink="http://
www.w3.org/1999/xlink" xmlns:p0="http://www.f******.com/2002-11-11">

<xsl:output method="html" encoding="Shift_JIS"/>

<xsl:template match="/">
<html>
<body>
<div class="pagelabel">MANAGEMENT RESULT</div>

<table>

<tr>
<th></th>
<th>2004</th>
<th>2003</th>
</tr>

<tr>
<td>SALES</td>
<td><xsl:value-of select="/xbrli:xbrl/p0:consolidatedResultsOfOperations.sales[(@contextRef
= 'X02') and (@unitRef = 'U1')]"/>YEN</td>
<td><xsl:value-of select="/xbrli:xbrl/p0:consolidatedResultsOfOperations.sales[(@contextRef
= 'X01') and (@unitRef = 'U1')]"/>YEN</td>
</tr>

<tr>
<td>OPERATING PROFIT</td>
<td><xsl:value-of select="2 * /xbrli:xbrl/
p0:consolidatedResultsOfOperations.operatingIncome[(@contextRef = 'X02') and (@unitRef =
'U1')]"/>YEN</td>
<td><xsl:value-of select="/xbrli:xbrl/
p0:consolidatedResultsOfOperations.operatingIncome[(@contextRef = 'X01') and (@unitRef =
'U1')]"/>YEN</td>
</tr>

</table>

</body>
</html>
</xsl:template>
</xsl:stylesheet>
```

FIG.16

```
<?xml version="1.0"?>
<xsl:stylesheet version="1.0" xmlns:xbrli="http://www.xbrl.org/2003/instance"
xmlns:xbrll="http://www.xbrl.org/2003/linkbase" xmlns:xsl="http://www.w3.org/1999/XSL/
Transform" xmlns:xsi="http://www.w3.org/2001/XMLSchema-instance" xmlns:xlink="http://
www.w3.org/1999/xlink" xmlns:p0="http://www.f*****.com/2002-11-11">

<xsl:output method="html" encoding="Shift_JIS"/>

<xsl:template match="/">
<html>
<body>
<div class="pagelabel">MANAGEMENT RESULT</div>

<table>

<tr>
<th></th>
<th>2004</th>
<th>2003</th>
</tr>

<tr>
<td>SALES</td>
<td><xsl:value-of select="/xbrli:xbrl/p0:consolidatedResultsOfOperations.sales[(@contextRef
= 'X02') and (@unitRef = 'U1')]"/>YEN</td>
<td><xsl:value-of select="/xbrli:xbrl/p0:consolidatedResultsOfOperations.sales[(@contextRef
= 'X01') and (@unitRef = 'U1')]"/>YEN</td>
</tr>

</table>

<font size="-5">
OPERATING PROFIT :
<xsl:value-of select="/xbrli:xbrl/
p0:consolidatedResultsOfOperations.operatingIncome[(@contextRef = 'X02') and (@unitRef =
'U1')]"/>YEN,
<xsl:value-of select="/xbrli:xbrl/
p0:consolidatedResultsOfOperations.operatingIncome[(@contextRef = 'X01') and (@unitRef =
'U1')]"/>YEN
</font>

</body>
</html>
</xsl:template>
</xsl:stylesheet>
```

FIG.18

```
<?xml version="1.0"?>
<xsl:stylesheet version="1.0" xmlns:xbrli="http://www.xbrl.org/2003/instance"
xmlns:xbrll="http://www.xbrl.org/2003/linkbase" xmlns:xsl="http://www.w3.org/1999/XSL/
Transform" xmlns:xsi="http://www.w3.org/2001/XMLSchema-instance" xmlns:xlink="http://
www.w3.org/1999/xlink" xmlns:p0="http://www.f******.com/2002-11-11">

<xsl:output method="html" encoding="Shift_JIS"/>

<xsl:template match="/">
<html>
<body>
<div class="pagelabel">MANAGEMENT RESULT</div>

<table>

<tr>
<th></th>
<th>2004</th>
<th>2003</th>
</tr>

<tr>
<td>SALES</td>
<td><xsl:value-of select="/xbrli:xbrl/p0:consolidatedResultsOfOperations.sales[(@contextRef =
'X02') and (@unitRef = 'U1')]"/>YEN</td>
<td><xsl:value-of select="/xbrli:xbrl/p0:consolidatedResultsOfOperations.sales[(@contextRef =
'X01') and (@unitRef = 'U1')]"/>YEN</td>
</tr>

<tr>
<td>OPERATING PROFIT</td>
<td><font color="FFFFFF"><xsl:value-of select="/xbrli:xbrl/
p0:consolidatedResultsOfOperations.operatingIncome[(@contextRef = 'X02') and (@unitRef =
'U1')]"/>YEN</font></td>
<td><font color="FFFFFF"><xsl:value-of select="/xbrli:xbrl/
p0:consolidatedResultsOfOperations.operatingIncome[(@contextRef = 'X01') and (@unitRef =
'U1')]"/>YEN</font></td>
</tr>

</table>

</body>
</html>
</xsl:template>
</xsl:stylesheet>
```

FIG.19

| DATA ITEM NAME | DATA |
|---|---|
| SALES, 2003 | 30000 |
| OPERATING PROFIT, 2003 | 20000 |
| SALES, 2004 | 40000 |
| OPERATING PROFIT, 2004 | 15000 |

FIG.21

```
<html >
<body>
<div class="pagelabel">MANAGEMENT RESULT</div>
<table>
<tr>
<th></th><th>2004</th><th>2003</th>
</tr>
<tr>
<td>SALES</td><td>40000YEN</td><td>30000YEN</td>
</tr>
<tr>
<td>OPERATING PROFIT</td><td>15000YEN</td><td>20000YEN</td>
</tr>
</table>
</body>
</html>
```

FIG.22

| SALES, 2004 | 40000YEN |
|---|---|
| SALES, 2003 | 30000YEN |
| OPERATING PROFIT, 2004 | 15000YEN |
| OPERATING PROFIT, 2003 | 20000YEN |

FIG.23

```
<html>
<body>
<div class="pagelabel">MANAGEMENT RESULT</div>
<table>
<tr>
<th></th><th>2004</th><th>2003</th>
</tr>
<tr>
<td>SALES</td><td>40000YEN</td><td>30000YEN<//
td>
</tr>
</table>
</body>
</html>
```

FIG.24

| SALES, 2004 | 40000YEN |
|---|---|
| SALES, 2003 | 30000YEN |

FIG.25

```html
<html>
<body>
<div class="pagelabel">MANAGEMENT RESULT</div>
<table>
<tr>
<th></th><th>2004</th><th>2003</th>
</tr>
<tr>
<td>SALES</td><td>40000YEN</td><td>30000YEN</td>
</tr>
<tr>
<td>OPERATING PROFIT</td><td>15000YEN</td><td>20000YEN</td>
</tr>
<tr>
<td>CURRENT TERM NET PROFIT</td><td>13000YEN</td><td>15000YEN</td>
</tr>
</table>
</body>
</html>
```

FIG.26

| | |
|---|---|
| SALES, 2004 | 40000YEN |
| SALES, 2003 | 30000YEN |
| OPERATING PROFIT, 2004 | 15000YEN |
| OPERATING PROFIT, 2003 | 20000YEN |
| CURRENT TERM NET PROFIT, 2004 | 13000YEN |
| CURRENT TERM NET PROFIT, 2003 | 15000YEN |

FIG.27

```
<html>
<body>
<div class="pagelabel">MANAGEMENT RESULT</div>
<table>
<tr>
<th></th><th>2004</th><th>2003</th>
</tr>
<tr>
<td>SALES</td><td>40000YEN</td><td>30000YEN</td>
</tr>
<tr>
<td>OPERATING PROFIT</td><td>30000YEN</td><td>20000YEN</td>
</tr>
</table>
</body>
</html>
```

FIG.28

| SALES, 2004 | 40000YEN |
|---|---|
| SALES, 2003 | 30000YEN |
| OPERATING PROFIT, 2004 | 30000YEN |
| OPERATING PROFIT, 2003 | 20000YEN |

FIG.29

```
<html>
<body>
<div class="pagelabel">MANAGEMENT RESULT</div>
<table>
<tr>
<th></th><th>2004</th><th>2003</th>
</tr>
<tr>
<td>SALES</td><td>40000YEN</td><td>30000YEN</td>
</tr>
<tr>
<td>OPERATING PROFIT</td><td><font color="FFFFFF">15000YEN</font></td><td><font color="FFFFFF">20000YEN</font></td>
</tr>
</table>
</body>
</html>
```

FIG.30

| SALES, 2004 | 40000YEN | — |
|---|---|---|
| SALES, 2003 | 30000YEN | — |
| OPERATING PROFIT, 2004 | 15000YEN | font color="FFFFFF" |
| OPERATING PROFIT, 2003 | 20000YEN | font color="FFFFFF" |

FIG.31

MANAGEMENT RESULT

|  | 2004 | 2003 |
|---|---|---|
| SALES | 40000YEN | 30000YEN |

LIST OF DATA , WHICH IS NOT USED FOR DISPLAY
OPERATING PROFIT :15000YEN (2004), 20000YEN (2003)

MANAGEMENT RESULT

|  | 2004 | 2003 |
|---|---|---|
| SALES | 40000YEN | 30000YEN |
| OPERATING PROFIT | 15000YEN | 20000YEN |
| CURRENT TERM NET PROFIT | 13000YEN | 15000YEN |

MANAGEMENT RESULT

|  | 2004 | 2003 |
|---|---|---|
| SALES | 40000YEN | 30000YEN |
| OPERATING PROFIT | 30000YEN<br>VALUE OF DATA :15000 | 20000YEN |

MANAGEMENT RESULT

|  | 2004 | 2003 |
|---|---|---|
| SALES | 40000YEN | 30000YEN |

OPERATING PROFIT :15000YEN, 20000YEN

ATTENTION

DISPLAY INFORMATION VERIFICATION PROGRAM, METHOD AND APPARATUS

CROSS-REFERENCE TO RELATED APPLICATIONS

This application is a continuing application, filed under 35 U.S.C. section 111(a), of International Application PCT/JP2006/300692, filed Jan. 19, 2006.

TECHNICAL FIELD OF THE INVENTION

This invention relates to a technique to verify display content of financial data when the financial data and information concerning display of the financial data is held.

BACKGROUND OF THE INVENTION

Conventionally, in case where each company submits financial information to the Financial Service Agency by electronic data, the company submits financial information in a format such as Excel, PDF (Portable Document Format), HTML (Hyper Text Markup Language) or the like (hereinafter, called display data as a whole.). In addition, in case where the financial institutions submit the financial information to the financial competent authorities by the electronic data, and in case where the company submits the financial information to a financing source by the electronic data when the company is financed, financial data in the same format is submitted. In the financial information, not only the data itself but also the display format are important elements, and for example, in the securities report, not only a rule for calculating data but also a rule when the calculated data is displayed are also determined by the Securities and Exchange law. However, the conventional display data is data for the display and has a disadvantage that data cannot be easily reused.

Against this problem, recently, in order to enhance the smooth distribution of the financial information, specification of eXtensible Business Reporting Language (XBRL) based on eXtensible Markup Language (XML) is enacted by the XBRL International, and the use of the financial data based on the specification of XBRL is advancing around the financial institutions such as the bank and the like. Please refer to the Web site URL http://www.xbrl-jp.org/ for the details of XBRL. In XBRL, for example, data itself such as sales and operating profit is included in a file, which is called an instance, and for example, display structure, display method and the like are included in a file, which is called a taxonomy. In addition, for example, US 2003/0198850 A1 discloses a technique to generate an instance and a taxonomy from a text document including the financial information.

However, all of the display structure and the display method are not included in the taxonomy, and for example, in order to display data along with the securities report, it is necessary to add the display information and display method for the exclusive use of the securities report to the taxonomy. Furthermore, although a mechanism to add original financial items by each company extending the taxonomy is provided, there is a case in which it is impossible to display data along with each company's intention only by the instance and taxonomy when each company originally extends the taxonomy.

In order to resolve these problems, it is considered that an applicant who applies the financial data including the financial information submits scripts (e.g. XML Stylesheet Language Transformations (XSLT)) to generate the display data or the conventional display data together with the financial data.

However, there is no guarantee that the information (i.e. the scripts or display data) concerning the display, which is submitted together with the financial data, has consistency with the financial data. Therefore, for example, when the information concerning the display has an error because of the applicant's mishit or the like, the financial information different from the financial information in the financial data is displayed. In addition, for example, the applicant can conceals data that the applicant would not like to disclose and can manipulate the data in order to represent the achievement well.

SUMMARY OF THE INVENTION

As described above, when the display content of the financial data is determined from the information concerning the display, there is possibility that the financial information different from the financial information in the financial data is displayed because of the applicant's mishit or the like, and for example, a reader such as an individual investor, bank and the like refers to the incorrect financial information.

Therefore, an object of this invention is to provide a technique to confirm whether or not the same financial information as the financial information in the financial data is displayed when the display content of the financial data is determined from the information concerning the display of the financial data.

A display information verification method according to a first aspect of this invention is a display information verification method when display data of financial data is generated from the financial data and scripts for the financial data, and includes: searching the scripts for an arithmetic instruction to process a numeric value in the financial data or a conversion instruction to convert a character string included in the financial data; and judging whether or not the arithmetic instruction or the conversion instruction detected in the searching is an instruction considered to manipulate the financial data.

Thus, it is possible to detect the instruction considered to manipulate data from the scripts, and to avoid display including the manipulation of the data. In addition, for example, by using information of the instruction (e.g. division by 100), which is stored inside in advance and is allowed to be used, it is possible to detect only the arithmetic instruction (e.g. multiplication to increase the numerical value) or the conversion instruction (e.g. translate in XSLT), which is not allowed to be used.

A display information verification method according to a second aspect of this invention includes: identifying data item name of data at a specific position in display based on an instruction, included in scripts, to determine a display format; searching the scripts for a display instruction to display data at the specific position; and judging whether or not the display instruction detected in the searching is an instruction considered to manipulate the display, based on the display instruction and the data item name identified in the identifying.

Thus, for example, it is possible to identify a data item displayed at each position in a table. Then, when it is confirmed based on the content of each display instruction (e.g. xsl:value-of in XSLT) whether or not data is displayed at a position to be originally displayed, it is possible to avoid the display including the manipulation of the display.

A display information verification method according to a third aspect of this invention includes: extracting a specific data item name and data corresponding to the specific data item name from financial data; searching scripts for an instruction to obtain and display the data corresponding to the specific data item name based on the specific data item name extracted in the extracting; and judging from a search result in said searching, whether or not the financial data is concealed.

Thus, it is possible to detect concealed data, which is included in the financial data but is not displayed, and to avoid display including the concealment of the data.

A display information verification method according to a fourth aspect of this invention includes: extracting, from financial data, a specific data item name and data corresponding to the specific data item name; searching scripts for an instruction to display data, which is not included in the financial data, based on the specific data item name extracted in the extracting; and judging from a search result of the searching, whether or not the data, which is not included in the financial data, is redundantly displayed.

Thus, it is possible to detect an instruction to display a numerical value and a character string, which are not included in the financial data, and to avoid the redundant display. In addition, for example, by using information about characters (e.g. Yen), which is stored inside in advance and allowed to be used, it is possible to detect only the instruction to display characters (e.g. good result), which is not allowed to be used.

A display information verification method according to a fifth aspect of this invention is a display information verification method when financial data and display data of the financial data are held, and includes: extracting, from the financial data, a data item name and corresponding data corresponding to the data item name, and storing financial data analysis information including all combinations of the data item name and the corresponding data into a storage device; extracting, from display data, a second data item name and second corresponding data corresponding to the second data item name, based on the instruction included in the display data, to determine a display format, and storing display data analysis information including all combinations of the second data item name and the second corresponding data into the storage device; comparing the financial data analysis information and the display data analysis information, which are stored in the storage device, and judging whether or not at least one of data concealment, redundant data display, data manipulation and display manipulation exists in the display data.

Thus, it is possible to detect at least one of the data concealment, the data redundant display, data manipulation and display manipulation, and to avoid the incorrect display.

In addition, the extracting from the display data may include, when a predetermined instruction to designate a display format for the second data item name or the second corresponding data exists, storing information of the predetermined instruction in association with the combination of the second data item name and the second corresponding data in the display data analysis information into the storage device, and the comparing and judging may include judging based on the information of the predetermined instruction, which is stored in the storage device, whether or not the display manipulation exists in the display data. Thus, it is possible to detect an instruction considered to execute the display manipulation, and to avoid the display including the display manipulation.

In addition, the comparing and judging may include when the combination included only in the financial data analysis information exists, judging that the data concealment exists. Thus, it is possible to detect the concealed data, which is included in the financial data but is not displayed.

In addition, the comparing and judging may include when the combination included only in the display data analysis information exists, judging that the redundant data display exists. Thus, it is possible to detect data, which is not included in the financial data.

In addition, the comparing and judging may include when the corresponding data in a first combination included in the financial data analysis information is not identical to the second corresponding data in a second combination, which is included in the display data analysis information and includes the same second data item name as the first data item name included in the first combination, judging that the data manipulation exists. Thus, it is possible to confirm whether or not the data in the financial data and data in the display data are identical.

In addition, the comparing and judging may include: comparing respective predetermined instructions included in the display data analysis information each other; and when a predetermined instruction causing display in a different form or a different display format from that of other data item name or other corresponding data exists, judging that the display manipulation exists. Thus, for example, in case of HTML, it is possible to detect a font tag making the font size small and a table tag (e.g. </table>) to display data to be displayed in a table outside the table in error.

The display information verification method may further include, when at least one of the data concealment, the data redundant display, the data manipulation and the display manipulation exists, storing, as misrepresentation candidate information, information of detected one or ones of a concealment part, a redundant part, a data manipulation part and a display manipulation part into a verification result storage device; and modifying the display data so as to emphatically display the position of the misrepresentation candidate in the display based on the misrepresentation candidate information stored in the verification result storage device. Thus, it is possible to display the incorrect display so that the reader can easily grasp.

Furthermore, the modifying may include extracting true data to be originally displayed from the financial data based on the misrepresentation candidate information, and modifying the display data so as to emphatically display the true data to be originally displayed. Thus, it is possible for the reader to refer the same financial information as the financial information included in the financial data.

In addition, in the second or fifth aspect of this invention, the instruction to determine the display format may be an instruction to generate a table or a list. For example, in case of HTML, it is possible to identify or extract the data item name and the corresponding data of the data item name for each cell of the table according to the table tag, tr tag, th tag, and td tag.

Incidentally, it is possible to create a program for causing a computer to execute the aforementioned display information verification method according to this invention. The program is stored into a storage medium or a storage device such as, for example, a flexible disk, a CD-ROM, a magneto-optical disk, a semiconductor memory, or a hard disk. In addition, the program may be distributed as digital signals over a network in some cases. Data under processing is temporarily stored in the storage device such as a computer memory.

BRIEF DESCRIPTION OF THE DRAWINGS

FIG. 4 is a diagram showing an example of an XBRL taxonomy;

FIG. 5 is a diagram showing an example of the XBRL taxonomy;

FIG. 6 is a diagram showing an example of the XBRL taxonomy;

FIG. 7 is a diagram showing an example of scripts in XSLT format, which generates display data;

FIG. 11 is a diagram showing an example of the scripts in XSLT format, which includes the concealment;

FIG. 12A is a diagram showing a display example of the display data including the concealment;

FIG. 12B is a diagram showing a display example of the display data including the redundant display;

FIG. 12C is a diagram showing a display example of the display data including the data manipulation;

FIGS. 12D and 12E are diagrams showing a display example of the display data including the display manipulation;

FIG. 14 is a diagram showing an example of the scripts in XSLT format, which includes the redundant display;

FIG. 16 is a diagram showing an example of the scripts in XSLT format, which includes the data manipulation;

FIG. 18 is a diagram showing an example of the scripts in XSLT format, which includes the display manipulation;

FIG. 19 is a diagram showing an example of the scripts in XSLT format, which includes the display manipulation;

FIG. 21 is a diagram showing an example of combinations of the data item name and corresponding data, which are extracted from the financial data;

FIG. 22 is a diagram showing an example of the display data in HTML format;

FIG. 23 is a diagram showing an example of combinations of the data item name and corresponding data, which are extracted from the display data;

FIG. 24 is a diagram showing an example of the display data in HTML format, which includes the concealment;

FIG. 25 is a diagram showing an example of combinations of the data item name and corresponding data, which are extracted from the display data;

FIG. 26 is a diagram showing an example of the display data in HTML format, which includes the redundant display;

FIG. 27 is a diagram showing an example of combinations of the data item name and corresponding data, which are extracted from the display data;

FIG. 28 is a diagram showing an example of the display data in HTML format, which includes the data manipulation;

FIG. 29 is a diagram showing an example of combinations of the data item name and corresponding data, which are extracted from the display data;

FIG. 30 is a diagram showing an example of the display data in HTML format, which includes the display manipulation;

FIG. 31 is a diagram showing an example of the data item name and corresponding data, which are extracted from the display data;

DETAILED DESCRIPTION OF THE PREFERRED EMBODIMENTS

Figure 1:
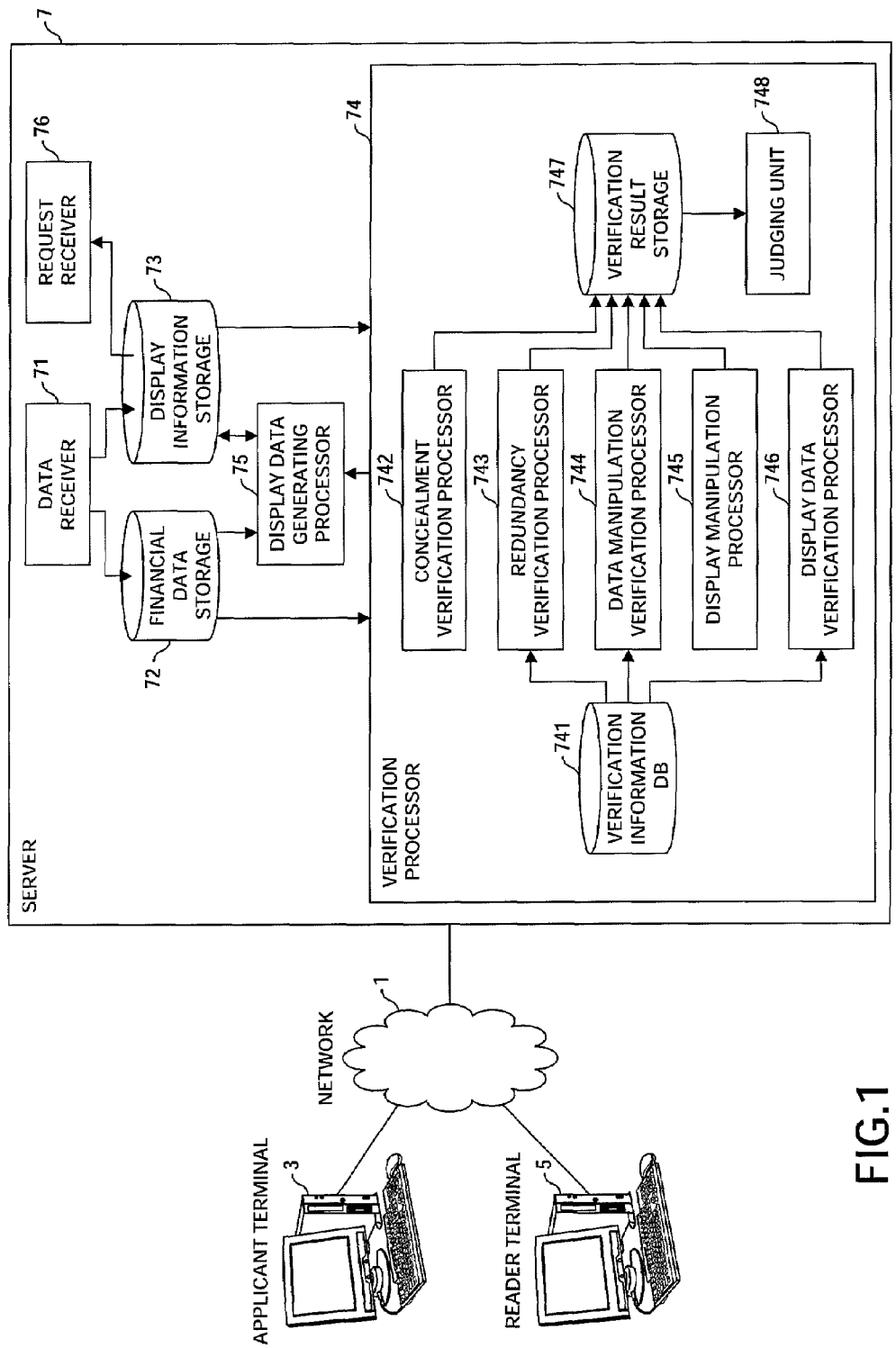
FIG. 1 is a system outline diagram of an embodiment of this invention.

FIG. 1 shows a system outline diagram according to one embodiment of this invention. In FIG. 1, a network 1 is connected with plural applicant terminals 3, which transmit financial data and information concerning display; plural reader terminals 5, which transmit a display data request; and a server 7.

The server 7 has a data receiver 71, which receives the financial data and the information concerning the display from the applicant terminals 3; a financial data storage 72, which stores the financial data received by the data receiver 71; a display information storage 73, which stores the information concerning the display, which is received by the data receiver 71, and display data generated by a display data generating processor 75; a verification processor 74, which carries out a verification processing based on the financial data stored in the financial data storage 72 and the information concerning the display, which is stored in the display information storage 73; the display data generating processor 75, which generates the display data from the financial data stored in the financial data storage 72 and the information concerning the display, which is stored in the display information storage 73; and a request receiver 76, which transmits the display data stored in the display information storage 73 to the reader terminal 5 when a display data request is received.

Furthermore, the verification processor 74 has a verification information DB 741, which stores information used for the verification; a concealment verification processor 742, which verifies the data concealment; a redundancy verification processor 743, which refers to the information stored in the verification information DB 741 to verify redundant data display; a data manipulation verification processor 744, which refers to the information stored in the verification information DB 741 to verify the data manipulation; a display manipulation verification processor 745, which verifies the display manipulation; a display data verification processor 746, which refers to the information stored in the verification information DB 741 to verify the display data; a verification result storage 747, which stores the verification result; and a judging unit 748, which transmits the verification result stored in the verification result storage 747 to the applicant terminal 3.

Figure 2:
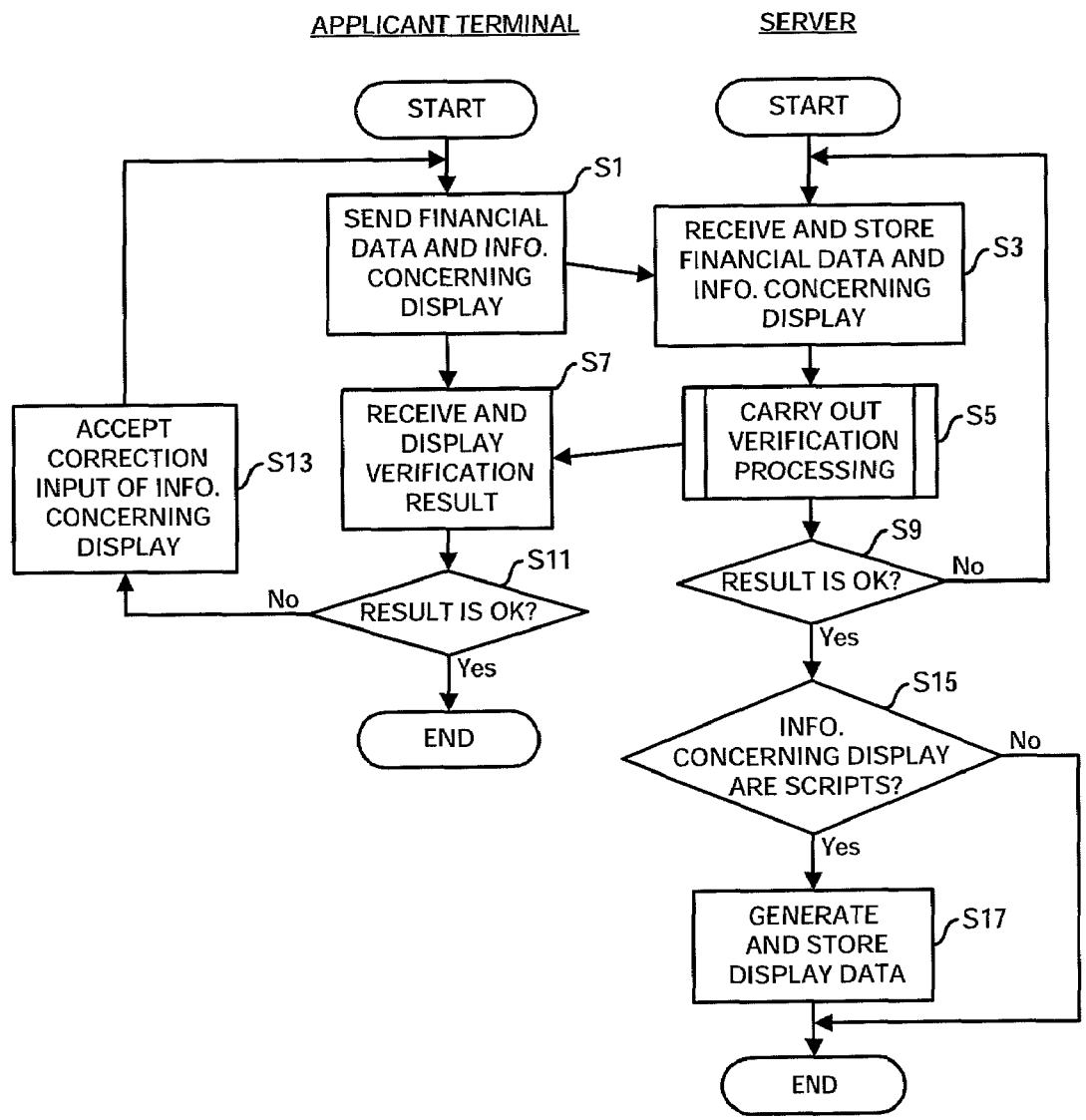
FIG. 2 is a diagram showing a processing flow according to this embodiment of this invention.

Next, an entire processing flow of the system shown in FIG. 1 will be explained by using FIG. 2. First, the applicant terminal 3 is operated by, for example, a staff in charge in each company, and transmits the financial data and the information concerning the display to the server 7 (step S1). When the data receiver 71 of the server 7 receives the financial data and the information concerning the display, the data receiver 71 stores the financial data into the financial data storage 73 and stores the information concerning the display into the display information storage 73 (step S3). The verification processor 74 of the server 7 carries out the verification processing by using the financial data stored in the financial data storage 72 and the information concerning the display, which is stored in the display information storage 73, and transmits the verification result to the applicant terminal 3 (step S5). The details of the verification processing at the step S5 will be described later. When the applicant terminal 3 receives the verification result, the applicant terminal 3 displays the verification result on a display device (step S7). When the verification result is other than "OK" (step S11: No route), the staff in charge in the company corrects the information concerning the display, and the applicant terminal 3 accepts the correction of the information concerning the display (step S13). When the verification result is "OK", the financial data and the information concerning the display are normally registered, and the processing is completed (step S11: Yes route). On the other hand, when the correction of the information concerning the display is accepted, the applicant terminal 3 transmits the financial data and the information concerning the display after the correction to the server 7 again (step S1). On the other hand, when the result of the verification processing is other than "OK" (step S9: No route), the server 7 receives the financial data and the information concerning the display after the correction from the applicant terminal 3, and carries out the verification processing again (steps S3 and S5). Incidentally, when any problem is detected in the verification processing, the financial data and the information concerning the display may be discarded. When the verification result is "OK" (step S9: Yes route), the display data generating processor 75 judges whether or not the information concerning the display are scripts (step S15). When the information concerning the display are scripts (step S15: Yes route), the display data generating processor 75 generates display data from the financial data stored in the financial data storage 72 and the scripts stored in the display information storage 73, and stores the display data into the display information storage 73 (step S17). When the information concerning the display is the display data, the processing is completed because the display data has already been stored into the display information storage 73 (step S15: No route).

Figure 3:
FIG. 3 is a diagram showing an example of an XBRL instance.

An example of the financial data received from the applicant terminal 3 will be shown in FIGS. 3 to 6. In this embodiment, it is assumed that the financial data is created based on the specification of XBRL. FIG. 3 shows an example of an instance, and the sales and operating profit are defined. In FIG. 3, a context element 301 defines "X01" is A.D. 2003, and a context element 301 defines "X02" is A.D. 2004. In addition, "p0:consolidatedResultsOfOperations.sales" in data 303 and data 305 indicates the sales, and "p0:consolidatedResultsOfOperations.operatingIncome" in data 304 and data 306 indicate the operating profit. Therefore, the data 303 defines the sales in 2003 is 30000, the data 304 defines the operating profit in 2003 is 20000, the data 305 defines the sales in 2004 is 40000, and the data 306 defines the operating profit in 2004 is 15000. Furthermore, FIG. 4 defines a list of accounting concepts, and FIGS. 5 and 6 define labels for respective accounting concepts. For example, a label definition 501 in FIG. 5 associates "p0:consolidatedResultsOfOperations.operatingIncome" with the operating profit, and a label definition 601 in FIG. 6 associates "p0:consolidatedResultsOfOperations.sales" with the sales.

Figures 8, 9:
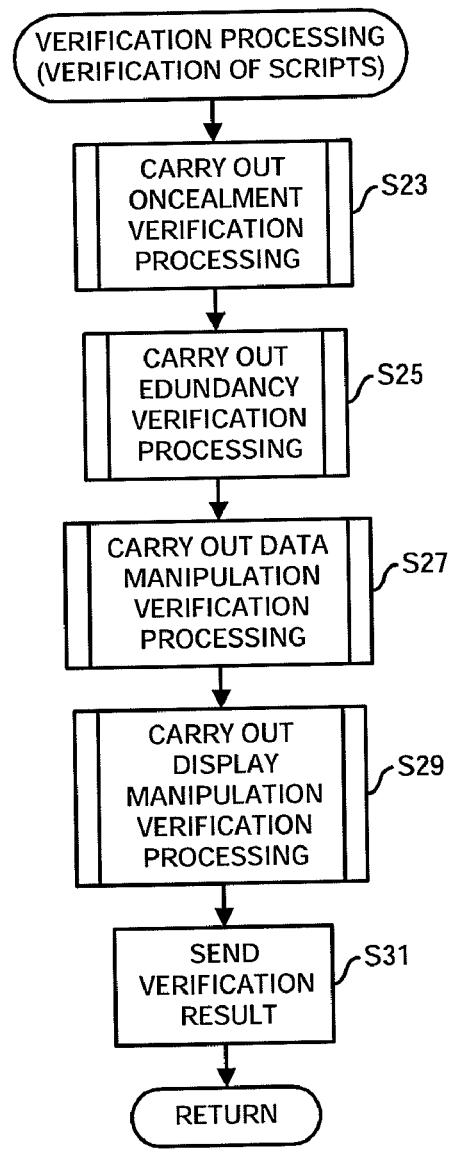
FIG. 8 is a diagram showing a display example of the display data.
FIG. 9 is a diagram showing a processing flow of a verification processing.

In addition, an example of the scripts, which generates the display data of the financial data shown in FIGS. 3 to 6, will be shown in FIG. 7. Incidentally, in this embodiment, it is assumed that the scripts are described by XSLT to generate the display data in the HTML format. Furthermore, a display example of the display data generated from the scripts shown in FIG. 7 will be shown in FIG. 8. In FIG. 8, the table includes lines of the sales and operating profit and columns of 2004 and 2003, and values defined by the instances are respectively displayed in corresponding cells.

Next, the details of the verification processing (step S5) in a case where the information concerning the display are the scripts will be explained by using FIGS. 9 to 19. The details of the verification processing in a case where the information concerning the display is the display data will be explained later. The verification processor 74 carries out a processing as shown in FIG. 9 by using the financial data stored in the financial data storage 72 and the scripts stored in the display information storage 73. First, the concealment verification processor 742 in the verification processor 74 carries out a concealment verification processing (step S23). The details of the concealment verification processing will be explained by using FIG. 10. First, the concealment verification processor 742 extracts a data item name and corresponding data from the financial data (step S33). As described above, in the financial data, "p0:consolidatedResultsOfOperations.sales" is defined as the sales, "p0:consolidatedResultsOfOperations.operatingIncome" is defined as the operating profit, "X01" is defined as A.D. 2003, and "X02" is defined as A.D. 2004. Therefore, as the data item name and corresponding data, "sales, 2003, 30000" are extracted from the data 303 in the financial data shown in FIG. 3. Next, the concealment verification processor 742 searches the scripts for an instruction to obtain and display the extracted data item name and corresponding data (step S35). For example, because, in XSLT, "xsl:value-of" represents a display instruction and "select" represents an acquisition instruction, instructions including xsl:value-of and select are sought. Then, the concealment verification processor 742 judges whether or not the detected instructions including xsl:value-of and select obtain data of the sales in 2003. Specifically, because the sales is defined by "p0:consolidatedResultsOfOperations.sales" and A.D. 2003 is defined by "X01", the concealment verification processor 742 judges whether or not the acquisition instruction includes "p0:consolidatedResultsOfOperations.sales" and "X01". Therefore, <xsl:value-of select="/xbrli:xbrl/p0:consolidatedResultsOfOperations.sales [(@contextRef='X01') and (@unitRef='U1')]"/> in the scripts shown in FIG. 7 is detected as the instruction to obtain and display the data of the sales in 2003. When there is no instruction to obtain and display the extracted data item name and corresponding data in the scripts (step S35: No route), it is judged that a concealed part exists in the scripts, and the concealment verification processor 742 stores information of the concealed part (e.g. the concealed data item name and corresponding data) into the verification result storage 747 (step S37). When there is an instruction to obtain and display the extracted data item name and corresponding data in the scripts (step S35: Yes route), the concealment verification processor 742 judges whether or not all of the data item names in the financial data have been verified (step S39).

In the example of FIG. 3, because the data 304, data 305 and data 306 have not been verified, the processing returns to the step S33 (step S39: No route). Then, according to the processing flow of FIG. 10, the verification of the data 304, data 305 and data 306 is carried out in sequence. In the verification processing for the data 304, "operating profit, 2003, 20000" are extracted as the data item name and corresponding data, and <xsl:value-of select="/xbrli:xbrl/p0:consolidatedResultsOfOperations.operatingIncome [(@contextRef='X01') and (@unitRef='U1')]"/> in the scripts of FIG. 7 is detected as the instruction to obtain and display the extracted data item name and corresponding data. In addition, in the verification processing for the data 305, "sales, 2004, 40000" are extracted as the data item and corresponding data, and <xsl:value-of select="/xbrli:xbrl/p0:consolidatedResultsOfOperations.sales[(@c ontextRef='X02') and (@unitRef='U1')]"/> in the scripts of FIG. 7 is detected as the instruction to obtain and display the extracted item name and corresponding data. Moreover, in the verification processing for the data 306, "operating profit, 2004, 15000" are extracted as the data item and corresponding data, and <xsl:value-of select="/xbrli:xbrl/p0:consolidatedResultsOfOperations.operating Income [(@contextRef='X02') and (@unitRef='U1')]"/> is detected as the instruction to obtain and display the extracted item name and corresponding data. When all data item names in the financial data have been verified (step S39: Yes route), the concealment verification processing is completed and the processing returns to the original processing.

In addition, FIG. 11 shows an example of scripts in which an instruction considered to conceal data exists, and FIG. 12A shows an example of the display when the display data is generated by the scripts in FIG. 11. When the scripts in FIG. 7 is compared with the scripts in FIG. 11, there is no instruction to obtain and display the operating profits in 2003 and 2004 in the scripts of FIG. 11. Specifically, <tr><td>operating profit</td><td><xsl:value-of select="/xbrli:xbrl/p0:consolidatedResultsOfOperations.operating Income[(@contextRef='X02') and (@unitRef='U1')]"/>Yen</td><td><xsl:value-of select="/xbrli:xbrl/p0:consolidatedResultsOfOperations.operating Income [(@contextRef='X01 ') and (@unitRef='U1')]"/>Yen</td></tr> does not exist in the scripts of FIG. 11. Therefore, in the display example shown in FIG. 12A, only a line of the sales is displayed, and any line of the operating profit is not displayed.

Figure 10:
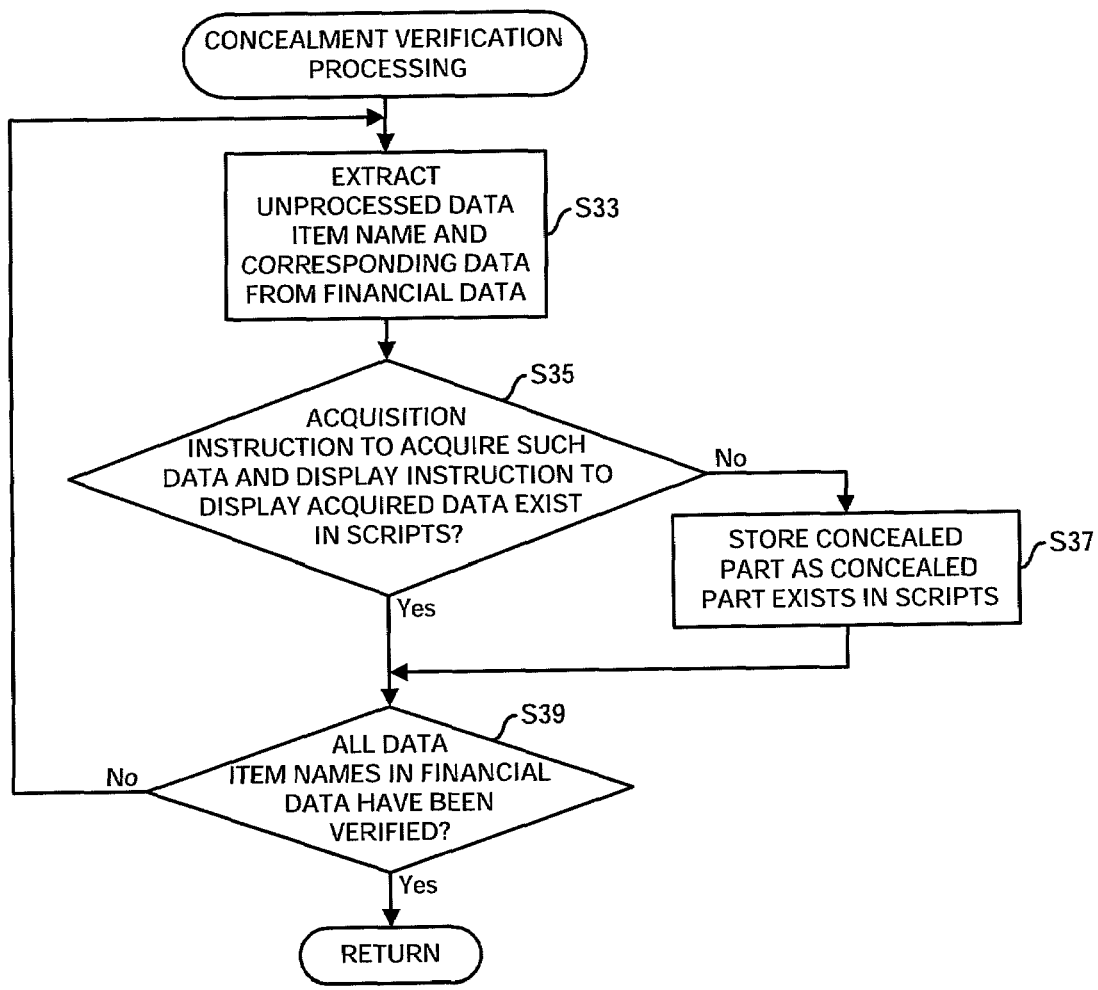
FIG. 10 is a diagram showing a processing flow of a concealment verification processing.

By carrying out the processing as shown in FIG. 10, it is possible to detect data, which is included in the financial data but is not displayed, and to avoid the display including the data concealment.

Returning to the explanation of the processing shown in FIG. 9, the redundancy verification processor 743 in the verification processor 74 carries out a redundancy verification processing (step S25). The details of the redundancy verification processing will be explained by using FIG. 13. First, the redundancy verification processor 743 extracts all data item names and corresponding data from the financial data (step S41). In the example of the financial data in FIG. 3, four sets of "sales, 2003, 30000", "operating profit, 2003, 20000", "sales 2004, 40000" and "operating profit, 2004, 15000" are extracted. The redundancy verification processor 743 searches the scripts for a redundant display instruction to display data other than the extracted data (step S43). For example, in the scripts of FIG. 7, a th tag or td tag to display "2004", "2003", "sales", "<xsl:value-of select="/xbrli:xbrl/p0:consolidatedResultsOfOperations.sales[(@c ontextRef='X02') and (@unitRef='U1')]"/>", "Yen", "<xsl:value-of select="/xbrli:xbrl/p0:consolidatedResultsOfOperations.sales[(@c ontextRef='X01') and (@unitRef='U1')] "/>", "Yen", "operating profit", "<xsl:value-of select="/xbrli:xbrl/p0:consolidatedResultsOfOperations.operating Income [(@contextRef='X02') and (@unitRef='U1')]"/>", "Yen", "xsl:value-of select="/xbrli:xbrl/p0:consolidatedResultsOfOperations.operating Income[(@contextRef='X01') and (@unitRef='U1')]"/>" and "Yen" in sequence from the top exist. Therefore, the redundancy verification processor 743 judges whether or not the content of the th tag or td tag is the content of the extracted data. "2004", "2003", "sales" and "operating profit" are included in the content of the extracted data. In addition, because "p0:consolidatedResultsOfOperations.sales" is defined as the sales, "p0:consolidatedResultsOfOperations.operatingIncome" is defined as the operating profit, "X01" is defined as A.D. 2003, "X02" is defined as A.D. 2004, "<xsl:value-of select="/xbrli:xbrl/p0:consolidatedResultsOfOperations.sales[(@c ontextRef='X02') and (@unitRef='U1')]"/> indicates the sales in 2004,"<xsl:value-of select="/xbrli:xbrl/p0:consolidatedResultsOfOperations.sales[(@c ontextRef='X01') and (@unitRef='U1')]"/> indicates the sales in 2003, "<xsl:value-of select="/xbrli:xbrl/p0:consolidatedResultsOfOperations.operating Income [(@contextRef='X02') and (@unitRef='U1')]"/>" indicates the operating profit in 2004, and "<xsl:value-of select="/xbrli:xbrl/p0:consolidatedResultsOfOperations.operating Income[(@contextRef='X01') and (@unitRef='U1')]"/>" indicates the operating profit in 2003, and those indicate the contents included in the extracted data. Moreover, because "Yen" is not included in the extracted data, the td tag to display "Yen" is judged to be the redundant display instruction. When there is a redundant display instruction (step S43: Yes route), the redundancy verification processor 743 judges whether or not the data displayed by the redundant display instruction is allowed content (step S45). Whether or not it is allowed content is judged based on information stored in the verification information DB 741. In the verification information DB 741, for example, characters allowed to be used, such as "Yen", "Unit" or the like are registered. Reversely, characters, which are not allowed to be used, may be registered in the verification information DB 741. Therefore, because the td tag to display "Yen" is the content allowed to be used, it is judged that it is not the redundancy display instruction, and the redundancy verification processing is completed and the processing returns to the original processing (step S45: Yes route). When data displayed by the redundancy display instruction is the content, which is not allowed (step S45: No route), the redundancy verification processor 743 judges that there is a redundancy position in the scripts, and stores information of the redundant part (e.g. data item name and corresponding data, which are displayed by the redundant display instruction) into the verification result storage 747 (step S47). On the other hand, when there is no redundant display instruction although the scripts are traced (step S43: No route), the redundancy verification processing is completed and the processing returns to the original processing.

In addition, FIG. 14 shows an example of the scripts in which the redundant part exists, and FIG. 12B shows an example of the display when the display data is generated by the scripts of FIG. 14. When the scripts of FIG. 7 are compared with the scripts of FIG. 14, td tags to display current term net profits in 2003 and 2004 exist only in the scripts of FIG. 14. Specifically, <td>current term net profit</td><td>13000 Yen</td><td>15000 Yen</td> in the redundant part 1401 of FIG. 14 does not exist in the scripts of FIG. 7. Therefore, in the display example shown in FIG. 12B, a line for the current term net profit, which does not exist in the financial data, is displayed.

Figure 13:
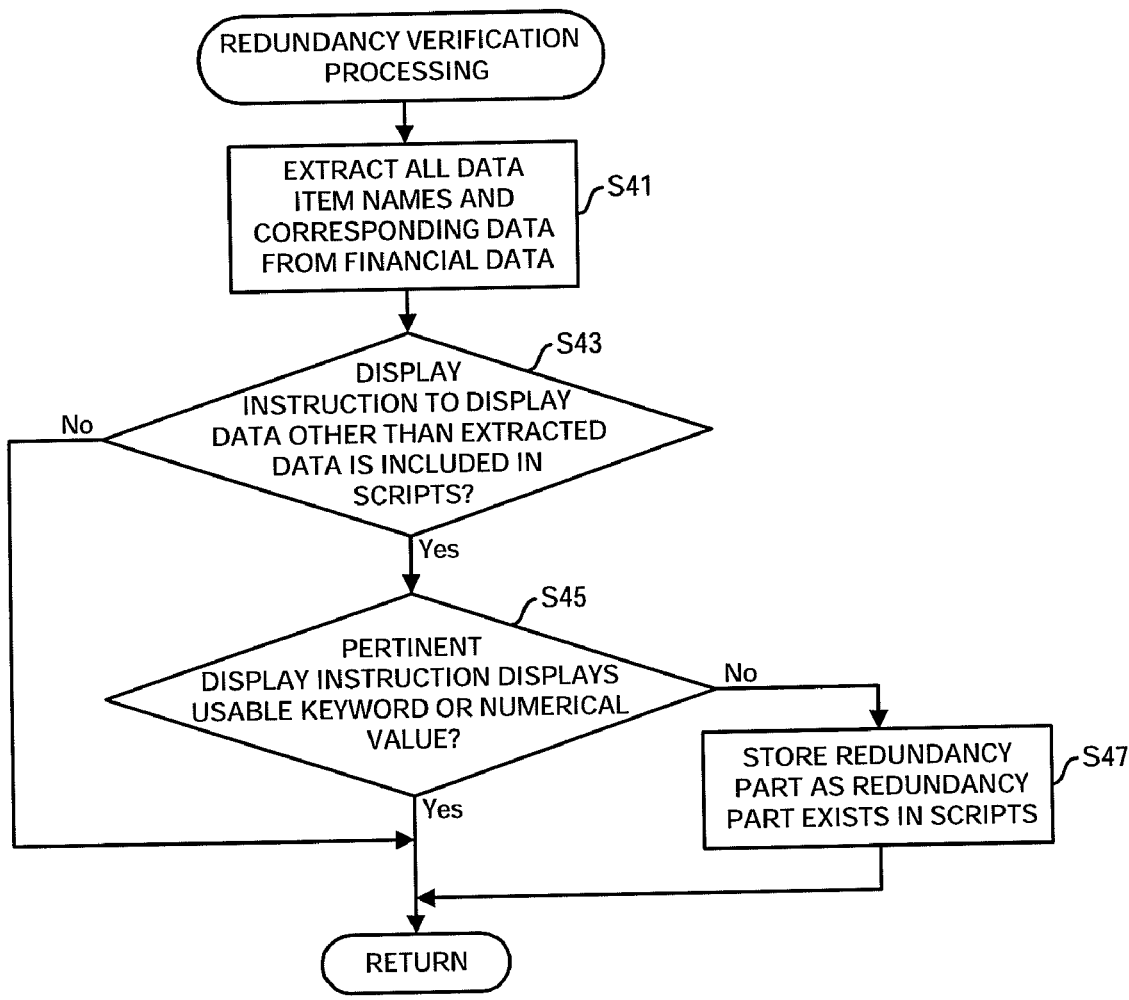
FIG. 13 is a diagram showing a processing flow of a redundancy verification processing.

By carrying out the processing as shown in FIG. 13, it is possible to detect an instruction to display numerical values and character strings, which are not included in the financial data, and to avoid the redundant display. In addition, for example, by using the information of the characters, which are stored inside in advance and are allowed to be used, it is possible to detect only the instruction to display the characters, which are not allowed to be used.

Returning to the explanation of the processing flow in FIG. 9, the data manipulation verification processor 744 of the verification processor 74 carries out a data manipulation processing (step S27). The details of the data manipulation verification processing will be explained by using FIG. 15. First, the data manipulation verification processor 744 searches the scripts for an arithmetic instruction to process the numerical value included in the financial data or a conversion instruction to convert the character string included in the financial data (step S49). When such an arithmetic instruction or conversion instruction does not exist (step S49: No route), the data manipulation verification processing is completed and the processing returns to the original processing. On the other hand, when such an arithmetic instruction or conversion instruction exists (step S49: Yes route), the data manipulation verification processor 744 judges whether or not the arithmetic instruction or conversion instruction is allowed to be used (step S51). Whether or not it is the arithmetic instruction or conversion instruction allowed to be used is judged based on the information stored in the verification information DB 741. In the verification information DB 741, for example, the arithmetic instruction allowed to be used such as the division by one million in order to use one million as one unit is stored. When it is the arithmetic instruction or the conversion instruction allowed to be used, the data manipulation verification processing is completed and the processing returns to the original processing (step S51: Yes route). When it is the arithmetic instruction or the conversion instruction, which is not allowed to be used (step S51: No route), the data manipulation verification processor 744 stores information of the data manipulation part (e.g. data item name and corresponding data including the data manipulation) into the verification result storage 747 as the data manipulation part exists in the scripts (step S53).

In addition, FIG. 16 shows an example of the scripts in which the data manipulation part exists, and FIG. 12C shows an example of the display when the display data is generated by the scripts of FIG. 16. When the scripts of FIG. 16 is compared with the scripts of FIG. 7, an arithmetic instruction "2\*" to process the financial data exists in an instruction to display the operating profit in 2004 in the scripts of FIG. 16 "<xsl:value-of select="2\* /xbrli:xbrl/p0:consolidatedResultsOfOperations.operatingIncome[(@contextRef='X02 ') and (@unitRef='U1')]"/>". Therefore, in the display example shown in FIG. 12C, the operating profit in 2004, which will be originally displayed as 15000 Yen, is displayed as 30000 Yen.

Figure 15:
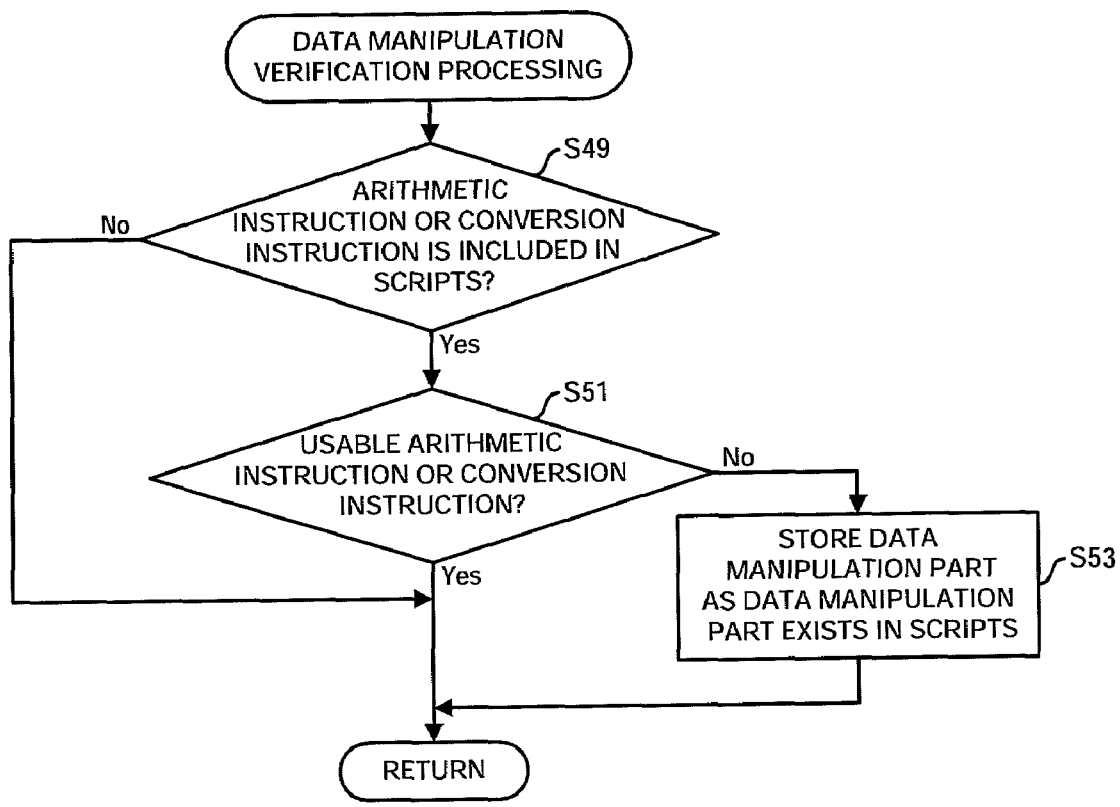
FIG. 15 is a diagram showing a processing of a data manipulation verification processing.

By carrying out the processing as shown in FIG. 15, it is possible to detect an instruction considered to manipulate data from the scripts, and to avoid the display including the data manipulation. In addition, for example, by using information of the instructions, which are stored inside in advance and are allowed to be used, it is possible to detect only the arithmetic instruction, which is not allowed to be used.

Returning to the explanation of the processing flow in FIG. 9, the display manipulation verification processor 745 of the verification processor 74 carries out a display manipulation verification processing (step S29). The display manipulation processing will be explained by using FIG. 17. First, the display manipulation verification processor 745 obtains item names in each column from the scripts (step S55). In the example of FIG. 7, based on the th tag (i.e. <th></th>2004</th><th>2003</th>), it can be judged that the item name of the second column is 2004, and the item name of the third column is 2003. Next, the display manipulation verification processor 745 obtains one line output part from the scripts (step S57). Specifically, <td>sales</td><td><xsl:value-of select="/xbrli:xbrl/p0:consolidatedResultsOfOperations.sales[(@c ontextRef='X02') and (@unitRef='U1')]"/>Yen</td><td><xsl:value-of select="/xbrli:xbrl/p0:consolidatedResultsOfOperations.sales[(@c ontextRef='X01') and (@unitRef='U1')]"/>Yen</td> between the <tr> tag and the </tr> tag is obtained as the first output part. Next, the display manipulation verification processor 745 extracts a data item name in the pertinent line from the output part, and identifies an element name corresponding to the data item name (step S59). In the example of FIG. 7, according to the table structure, the content displayed by the first td tag of the output part is extracted as the data item name in the pertinent line. Therefore, the sales is extracted as the data item name. In addition, by referring to the financial data, the element name corresponding to the sales is identified. As described above, the element name corresponding to the sales is "p0:consolidatedResultsOfOperations.sales". Next, the display manipulation verification processor 745 extracts one display instruction from the output part (step S61). In the example of FIG. 7, <td><xsl:value-of select="/xbrli:xbrl/p0:consolidatedResultsOfOperations.sales[(@c ontextRef='X02') and (@unitRef='U1')]"/>Yen</td> is extracted. Furthermore, the display manipulation verification processor 745 identifies the data item name that the extracted display instruction displays (step S63). This is the display instruction displaying the data in the second column, and the sales in 2004 is identified as the data item name. Then, the display manipulation verification processor 745 judges whether or not the data that the extracted display instruction displays is the sales in 2004 (step S65). From "p0:consolidatedResultsOfOperations.sales" of the extracted display instruction, it is apparent that the data is the sales. In addition, in the instance of FIG. 3, "X02" is defined as A.D. 2004, and from "(@contextRef='X02')" of the extracted display instruction, it is apparent that the data is the data in 2004. Therefore, it is judges that the extracted display instruction displays the sales data in 2004. When the data that the extracted display instruction displays is data indicated by the element name and the data item name (step S65: Yes route), the display manipulation verification processor 745 judges whether or not the verification has been completed for all of the display instructions included in the output part (step S69). When an unverified display instruction exists, the processing returns to the processing of the step S61 (step S69: No route).

After that, in the example of FIG. 7, <td><xsl:value-of select="/xbrli:xbrl/p0:consolidatedResultsOfOperations.sales[(@c ontextRef='X01') and (@unitRef='U1')]"/>Yen</td> is extracted. This is an instruction displaying data in the third column, and the data item name is the sales in 2003. From "p0:consolidatedResultsOfOperations.sales" of the extracted instruction, it is apparent that it is the sales. In addition, in the instance of FIG. 3, "X01" is defined as A.D. 2003, and from "(@contextRef='X01')" of the extracted display instruction, it is apparent that it is data in 2003. Therefore, it can be judged that the extracted display instruction displays the sales data in 2003. On the other hand, when the data that the extracted display instruction displays is not the data indicated by the element name and the data item name (step S65: No route), the display manipulation verification processor 745 stores information of the display manipulation part (e.g. data item name and corresponding data including the display manipulation) into the verification result storage 747 as the display manipulation part exists in the scripts (step S67). Incidentally, when there is designation of the form (e.g. the font size, the font color or the like) in the display instruction, and there is a display instruction displaying in the form different from that of other data, it may be presumed that there is the display manipulation. When the verification for all of the display instructions included in the output part is completed (step S69: Yes route), the display manipulation verification processor 745 judges whether or not the verification for the output parts in all lines is completed (step S71). When the verification for the output parts in all lines is completed, the display manipulation verification processing is completed and the processing returns to the original processing (step S71: Yes route).

In the example of FIG. 7, because there is an unverified output part, the processing returns to the step S57 (step S71: No route), "<td>operating profit</td><td><xsl:value-of select="/xbrli:xbrl/p0:consolidatedResultsOfOperations.operating Income[(@contextRef='X02') and (@unitRef='U1')]"/>Yen</td><td><xsl:value-of select="/xbrli:xbrl/p0:consolidatedResultsOfOperations.operating Income[(@contextRef='X01') and (@unitRef='U1')]"/>Yen</td> is obtained as the next output part. Similarly to the prior processing flow, the operating profit is detected as the item name, and "p0:consolidatedResultsOfOperations.operatingIncome" is detected as the element name. In addition, <td><xsl:value-of select="/xbrli:xbrl/p0:consolidatedResultsOfOperations.operating Income[(@contextRef='X02') and (@unitRef='U1')]"/>Yen</td> is extracted from the output part, and the operating profit in 2004 is identified as the data item name. From "p0:consolidatedResultsOfOperations.operatingIncome" of the extracted display instruction, it is apparent that it is the operating profit, and from "(@contextRef='X02')", it is apparent that it is data in 2004. After that, <td><xsl:value-of select="/xbrli:xbrl/p0:consolidatedResultsOfOperations.operating Income[(@contextRef='X01') and (@unitRef='U1')]"/>Yen</td> is extracted, and the operating profit in 2003 is identified as the data item name. From "p0:consolidatedResultsOfOperations.operatingIncome" of the extracted display instruction, it is apparent that it is the operating profit, and from "(@contextRef='X01'), it is apparent that it is data in 2003.

In addition, FIGS. 18 and 19 show an example of the scripts in which the display manipulation part exists, and an example of the display when the display data is generated by the scripts of FIG. 18 is shown in FIG. 12D, and an example of the display when the display data is generated by the scripts of FIG. 19 is shown in FIG. 12E. In the scripts of FIG. 18, because a </table> tag exists before the operating profit is displayed, the operating profit is displayed outside the table in the display example shown in FIG. 12D. In addition, in the scripts of FIG. 19, a <font color="FFFFFF"> tag exists in the display instruction of the operating profit, and the operating profit is displayed with the white. Accordingly, because it is the same color as the background color, data cannot be found in FIG. 12E.

Figure 17:
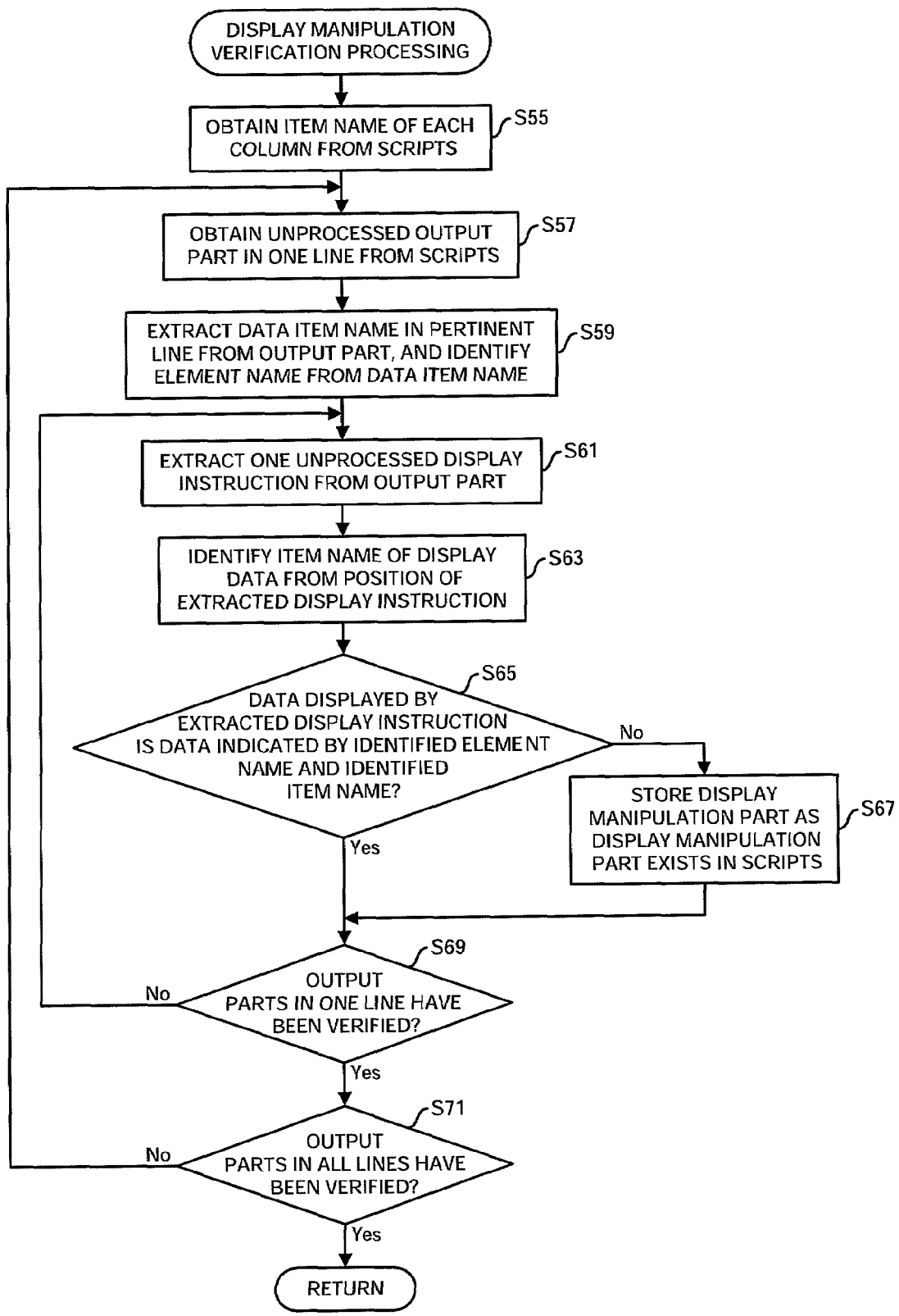
FIG. 17 is a diagram showing a processing flow of a display manipulation processing.

By carrying out the processing as shown in FIG. 17, it is possible to identify the data item displayed at each position in the table, and to avoid the display including the display manipulation when it is confirmed whether or not data is displayed at a position that the data should be originally displayed.

Returning to the explanation of the processing flow in FIG. 9, the judging unit 748 of the verification processor 74 transmits the verification result based on the verification result storage 747 to the applicant terminal 3 (step S31). Incidentally, when there is a problem in the scripts, information (e.g. concealed data item name and corresponding data) to identify the position including the problem may be included in the verification result and transmitted.

Figure 20:
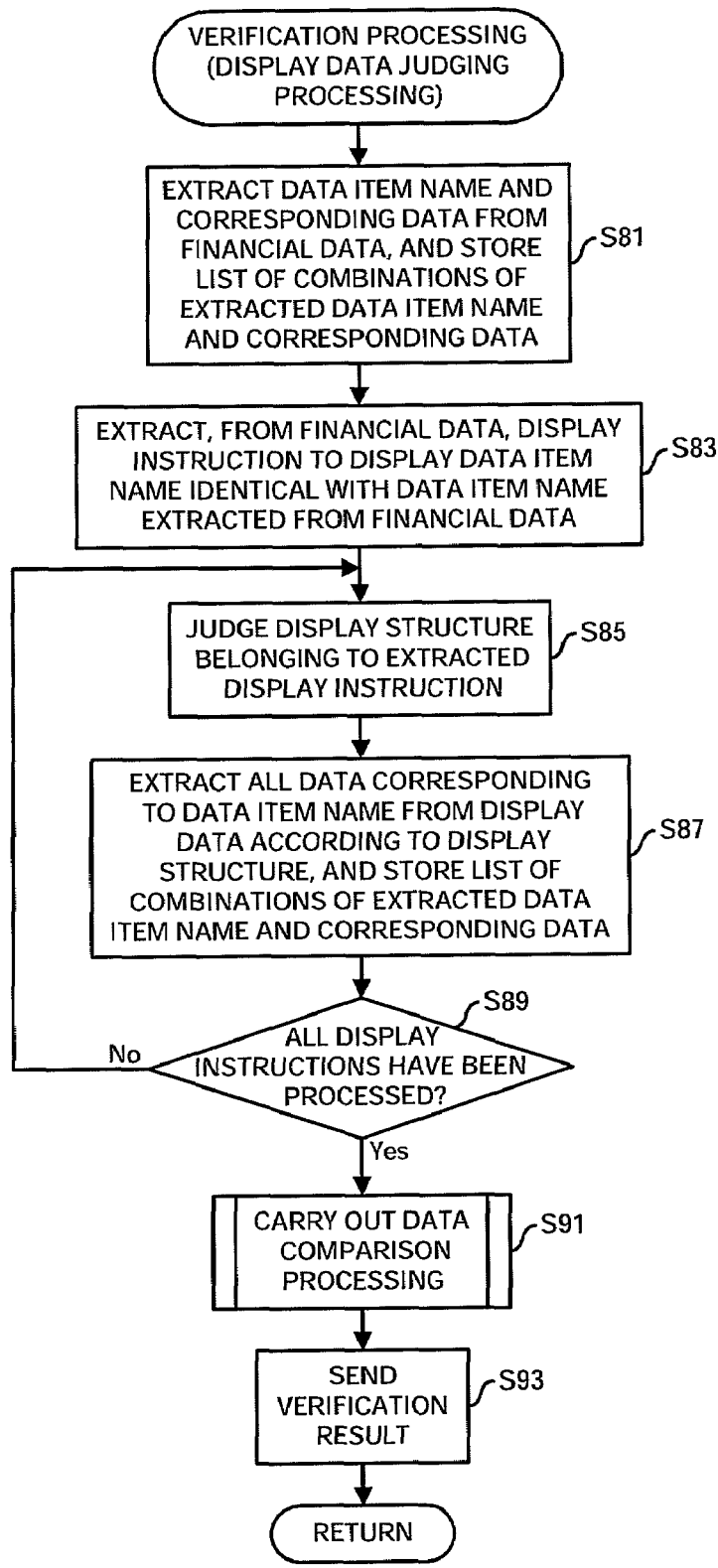
FIG. 20 is a diagram showing a processing flow of the verification processing.

The details of the verification processing when the information concerning the display is the display data will be explained by using FIGS. 20 to 32. The display data verification processor 746 of verification processor 74 carries out a processing as shown in FIG. 20 by using the financial data stored in the financial data storage 72 and the display data stored in the display information storage 73. First, the display data verification processor 746 extracts the data item name and corresponding data of the data item name, and stores a list of all combinations of the extracted data item name and corresponding data into a storage device (step S81). FIG. 21 shows an example of the list of the combinations of the data item name and corresponding data extracted from the financial data in FIG. 3. In an example of FIG. 21, four data sets of "sales, 2003, 30000", "operating profit, 2003, 2000", "sales, 2004, 40000" and "operating profit, 2004, 15000" are extracted.

Next, the display data verification processor 746 extracts, from the display data, a display instruction to display the same data item name as the data item name extracted from the financial data (step S83). FIG. 22 shows an example of the display data for the financial data of FIG. 3. For example, when "sales" and "operating profit" are extracted as the data item name from the financial data, first, <td>sales</td> in the display data of FIG. 22 is extracted.

Next, the display data verification processor 746 judges the display structure to which the extracted display instruction belongs (step S85). In the example of FIG. 22, because the extracted display instruction (i.e. <td>sales</td>) is between <table> and </table>, it is judged that it belongs to the table structure.

Next, the display data verification processor 746 extracts, from the display data, corresponding data of the data item name according to the display structure, and stores a list of combinations of the extracted data item name and corresponding data into the storage device (step S87). For example, in case of the table structure, from the th tag (i.e. <th></th><th>2004</th><th>2003</th>), 2004 in the second column and 2003 in the third column are identified, and data of the sales in 2004 and data of the sales in 2003 are extracted from the display data. In the example of FIG. 22, the td tag (i.e. <td>sales</td><td>40000 Yen</td><td>30000 Yen</td>), 40000 Yen (i.e. the sales in 2004) and 30000 Yen (i.e. the sales in 2003) are extracted, and a list of these combinations are stored into the storage device. In addition, when there is an instruction designating the display format of the data (e.g. <font size> and <font color>), the instruction designating the display format is stored into the storage device in association with the combination of the data item name and the corresponding data. Incidentally, although it is not shown in FIG. 22, the processing is carried out for all table tags when plural table tags exist, for example.

Next, the display data verification processor 746 judges whether or not the processing for all display instructions has been completed (step S89). In the example of FIG. 21, because the display instruction of the operating profit is not processed, the processing returns to the step S85 (step S89: No route). Similarly, the processing of the steps S85 to S87 is carried out for the operating profit, and 15000 Yen (i.e. the operating profit in 2004) and 20000 Yen (i.e. the operating profit in 2003) are extracted from the display data, and a list of those combinations is stored into the storage device. FIG. 23 shows an example of the list of the combinations of the data item name and corresponding data extracted from the display data in FIG. 22. In the example of FIG. 23, four data sets of "sales, 2004, 40000 Yen", "sales, 2003, 30000 Yen", "operating profit, 2004, 15000 Yen" and "operating profit, 2003, 20000 Yen" are included.

In addition, an example when the display data includes a problem will be shown in FIGS. 24 to 31. FIG. 24 shows an example of display data including the concealment. Compared with the example of FIG. 22, the display instruction to display the operating profit (i.e. <td>operating profit</td><td>15000 Yen</td><td>20000 Yen</td> does not exist in the example of FIG. 24. FIG. 25 shows an example of the list of the combinations of the data item name and corresponding data extracted from the display data of FIG. 24. FIG. 25 includes two data sets of "sales, 2004, 40000 Yen", "sales, 2003, 30000 Yen".

FIG. 26 shows an example of the display data including the redundant display. Compared with the example of FIG. 22, the display instruction to display the current term net profit (i.e. <td>current term net profit</td><td>13000 Yen</td><td>15000Yen</td>) exists in FIG. 26. FIG. 27 shows an example of the list of the combinations of the data item name and corresponding data extracted from the display data of FIG. 26. In FIG. 27, six data sets of "sales, 2004, 40000 Yen", "sales, 2003, 30000 Yen", "operating profit, 2004, 15000 Yen", "operating profit, 2003, 20000 Yen", "current term net profit, 2004, 13000 Yen" and "current term net profit, 2003, 15000 Yen" are included.

FIG. 28 shows an example of the display data including the data manipulation. In the example of FIG. 22, the operating profit in 2004 is 15000 Yen, but in FIG. 28, the operating profit in 2004 is 30000 Yen. FIG. 29 shows an example of a list of the combinations of the data item name and corresponding data extracted from the display data of FIG. 28. In FIG. 29, four data sets of "sales, 2004, 40000 Yen", "sales, 2003, 30000 Yen", "operating profit, 2004, 30000 Yen" and "operating profit, 2003, 20000 Yen" are included.

FIG. 30 shows an example of display data including the display manipulation. Compared with the example of FIG. 22, an instruction designating the font color for the operating profit (i.e. <font color="FFFFFF">) exists in the example of FIG. 30. FIG. 31 shows an example of a list of the combinations of the data item name and corresponding data extracted from the display data of FIG. 30. In FIG. 31, four data sets of "sales, 2004, 40000 Yen", "sales, 2003, 30000 Yen", "operating profit, 2004, 15000 Yen, font color="FFFFFF"", and "operating profit, 2003, 20000 Yen, font color="FFFFFF"" are included.

On the other hand, when the processing for all of the display instructions is completed (step S89: Yes route), the display data verification processor 746 carries out a data comparison processing (step S91). The details of the data comparison processing will be explained by using FIG. 32. First, the display data verification processor 746 compares the list generated from the financial data with the list generated from the display data, and judges whether or not there is a combination included only in the list generated from the financial data (step S95). For example, when the list of FIG. 21 (i.e. the list generated from the financial data) is compared with the list of FIG. 25 (i.e. the list generated from the display data with the concealment), the combinations of "operating profit, 2003, 20000" and "operating profit, 2004, 15000" are included only in the list of FIG. 21. Thus, when the combination, which is included only in the list generated from the financial data, exists (step S95: Yes route), the display data verification processor 746 stores information of the concealed part (e.g. the concealed data item name and corresponding data) into the verification result storage 747 as the concealed part exists in the display data (step S97).

Similarly, the display data verification processor 746 compares the list generated from the financial data with the list generated from the display data, and judges whether or not there is a combination included only in the list generated from the display data (step S99). For example, when the list of FIG. 22 is compared with the list of FIG. 27 (i.e. the list generated from the display data including the redundant display), the combinations of "current term net profit, 2004, 13000 Yen" and "current term net profit, 2003, 15000 Yen" are included only in the list of FIG. 27. Thus, when there is a combination included only in the list generated from the display data (step S99: Yes route), the display data verification processor 746 stores information of the redundant part (e.g. the data item name and corresponding data of the redundant display) into the verification result storage 747 as the redundant part exists in the display data (step S101).

Next, the display data verification processor 746 compares the combination data included in the list generated from the financial data with the combination data included in the list generated from the display data, and judges whether or not those data are identical (step S103). For example, when the list of FIG. 21 is compared with the list of FIG. 29 (i.e. the list generated from the display data including the data manipulation), the data of the operating profit in 2004 is different between "15000" and "30000". Thus, when data is different (step S103: Yes route), the display data verification processor 746 stores information of the data manipulation part (e.g. the data item name and corresponding data, which include the data manipulation) as the data manipulation part exists in the display data (step S105).

Furthermore, the display data verification processor 746 compares respective instructions designating a display format included in the list generated from the display data, and judges whether or not there is an instruction causing the display in a form (e.g. font size, font color) or a display format (e.g. display outside the table) different from that of other data item names and corresponding data (step S107). For example, when the respective instructions designating the display format, which are included in the list of FIG. 31 (i.e. the list generated from the display data including the display manipulation) are compared, there are a combination including "font color="FFFFFF"" and a combination, which does not include that display format. Thus, when there is an instruction causing the display in a display format different from that of other data item name or corresponding data (step S107: Yes route), the display data verification processor 746 stores information of the display manipulation part (e.g. data item name and corresponding data, which include the display manipulation) into the verification result storage 747 (step S109).

Returning to the explanation of the processing flow in FIG. 20, the judging unit 748 of the verification processor 74 transmits the verification result based on the data stored in the verification result storage 747 to the applicant terminal 3 (step S93). Incidentally, when the display data includes any problem, information to identify the parts of the problems may be included in the verification result and transmitted.

Figure 32:
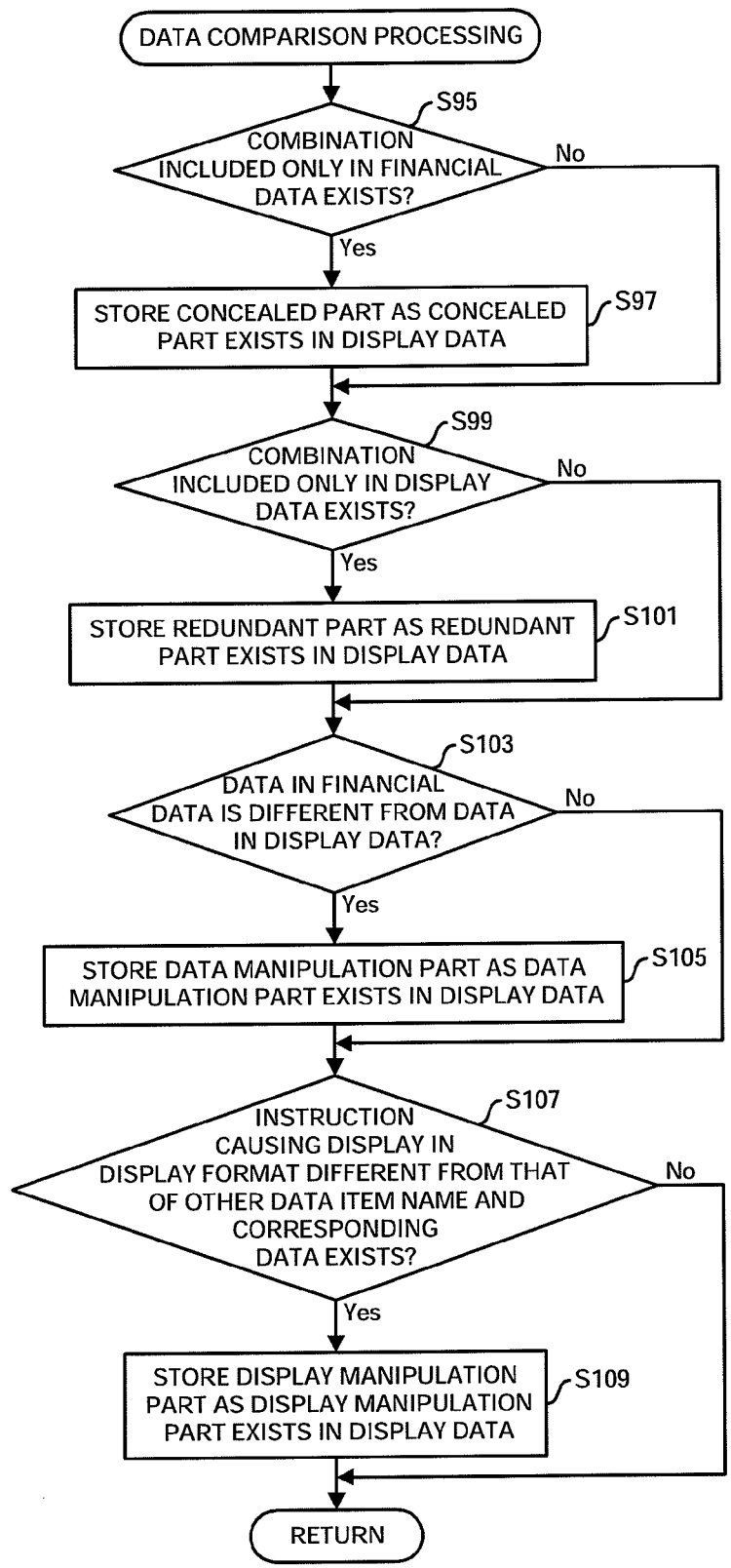
FIG. 32 is a diagram showing a processing flow of a data comparison processing.

When the processing as shown in FIGS. 20 and 32 is carried out, it is possible to detect at least one of the data concealment, redundant data display, data manipulation and display manipulation, and to avoid the incorrect display.

In addition, although it is not shown, the applicant terminal 3 may transmit only the financial data to the server 7. In such a case, the data receiver 71 of the server 7 stores the received financial data into the financial data storage 72, and the display data generating processor 75 generates appropriate display data from the financial data, and transmits the display data to the applicant terminal 3. The applicant terminal 3 receives the display data, and displays the display data on the display device. The applicant confirms whether or not there is no problem in the display data, and inputs the confirmation result into the applicant terminal 3. When the confirmation result is accepted, the applicant terminal 3 transmits the confirmation result to the server 7. When there is a problem in the display data (e.g. the confirmation result indicates "there is a problem"), the applicant corrects the display data, and inputs the corrected display data into the applicant terminal 3. When the corrected display data is accepted, the applicant terminal 3 transmits the financial data and the corrected display data to the server 7. On the other hand, when the confirmation result indicates "OK", the server 7 stores the display data into the display information storage 73. When the confirmation result indicates "there is a problem", the server 7 receives the financial data and the corrected display data, and carries out the verification processing of the display data. Because the verification processing is the same as the processing described above, the explanation for the details is omitted.

Figure 33:
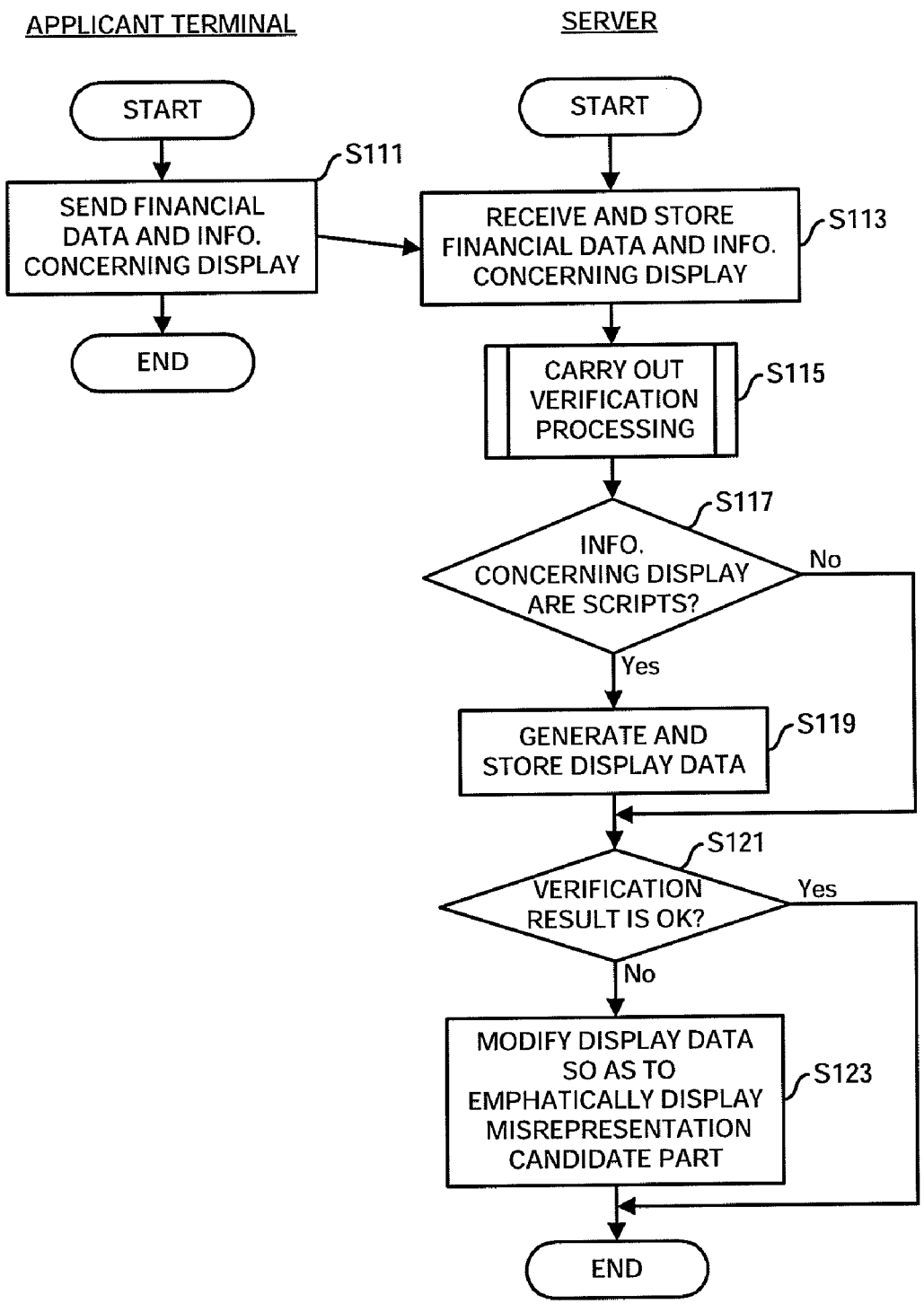
FIG. 33 is a diagram showing a processing flow according to the embodiment of this invention.
Figures 34A, 34B, 34C, 34D:
FIGS. 34A to 34D are diagrams showing a display example in which a misrepresentation candidate part is emphatically displayed.

In addition, there is a case where the verification result is not sent to the applicant terminal 3, as shown in FIG. 33. First, the applicant terminal 3 transmits the financial data and the information concerning the display to the server 7 (step S111). When the data receiver 71 of the server 7 receives the financial data and the information concerning the display, the data receiver 71 stores the financial data into the financial data storage 72 and stores the information concerning the display into the display information storage 73 (step S113). The verification processor 74 of the server 7 carries out the verification processing by using the financial data stored in the financial data storage 72 and the information concerning the display, which is stored in the display information storage 73 (step S115). Incidentally, although the processing to transmit the verification result (steps S31 and S93) exists in the processing flows shown in FIGS. 9 and 20, the verification result is not transmitted in the processing flow shown in FIG. 33. The verification processing other than the transmission of the verification result is the same as the aforementioned processing. Therefore, the details are omitted. When the information concerning the display are the scripts (step S117: Yes route), the display data generating processor 75 generates the display data from the financial data and the scripts, and stores the display data into the display information storage 73 (step S119). Then, when the verification result has no problem (step S121: Yes route), the processing is completed. On the other hand, when the verification result has a problem (step S121: No route), the display data generating processor 75 modifies the display data so as to emphatically display a misrepresentation candidate part (i.e. concealed part, redundant part, data manipulation part, or display manipulation part) based on at least one of information of the concealed part, information of the redundant part, information of the data manipulation part and information of the display manipulation part, which are stored in the verification result storage 747 (step S123). Display examples in which the misrepresentation candidate parts are emphatically displayed will be shown in FIGS. 34A to 34D. FIG. 34A shows a display example when the operating profit is concealed, and in order to clarify that the operating profit is not used for the display, the operating profit is displayed outside the table. In addition, FIG. 34B shows a display example when the current term net profit is redundantly displayed, the line of the current term net profit, which is the redundant display, is displayed with the hatching. Moreover, FIG. 34C shows a display example when the data manipulation of the operating profit in 2004 exists, and the cell of the operating profit in 2004 is displayed with the hatching, and the value (i.e. 15000) of the financial data is also displayed. In addition, FIG. 34D shows a display example when the display manipulation of the operating profit exists, and an attention mark for the operating profit, which is displayed outside the table, is displayed. By carrying out such emphatic display, it is possible for the reader to easily find out any problem in the display.

Figure 35:
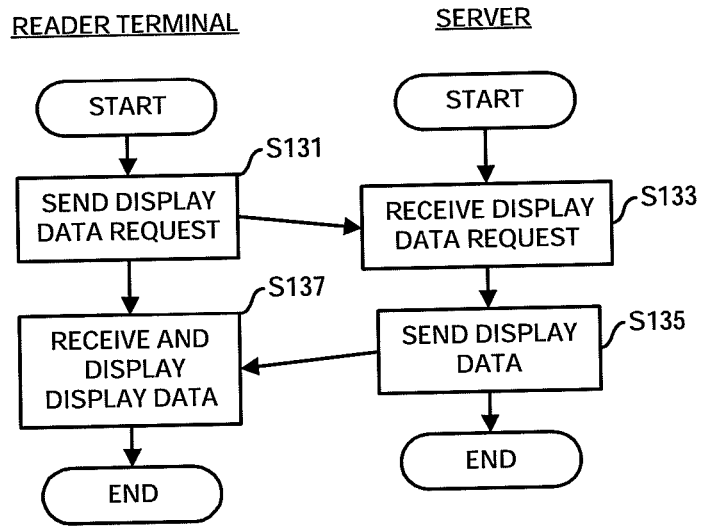
FIG. 35 is a diagram showing a processing flow according to the embodiment of this invention.

A processing flow when the display data stored in the server 7 will be shown in FIG. 35. First, the reader terminal 5 transmits a display data request to the server 7 (step S131). The request receiver 76 of the server 7, which received the display data request, obtains the requested display data from the display information storage 73, and transmits the requested display data to the reader terminal 5 (steps S133 and S135). The reader terminal 5, which received the display data, displays the display data on a display device (step S137).

As described above, according to this embodiment, even when the display content of the financial data is determined by the information concerning the display of the financial data, it is possible to avoid the incorrect display and to provide the financial information with high credibility, because it is confirmed whether or not the same financial information as the financial information in the financial data is displayed.

Although one embodiment of this invention was described above, this invention is not limited to this embodiment. For example, this invention is not limited to the financial data, and this invention can be applied to a case where data and information to specify display content of the data are separately used.

In addition, the functional block diagram shown in FIG. 1 is a mere example, and the functional blocks may not always correspond to actual program module configuration. Furthermore, it is possible to execute the concealment verification processing, the redundancy verification processing, the data manipulation verification processing and the display manipulation processing in parallel. Moreover, there are steps whose processing order is exchanged as far as the processing result is not changed.

In addition, a program for causing to execute the aforementioned verification processing or its portion may be distributed to the applicants, and before transmitting to the server 7, the applicant himself or herself may verify the data by using the program, and then may transmit the information concerning the display after the verification and the financial data from the applicant terminal 3.

Figure 36:
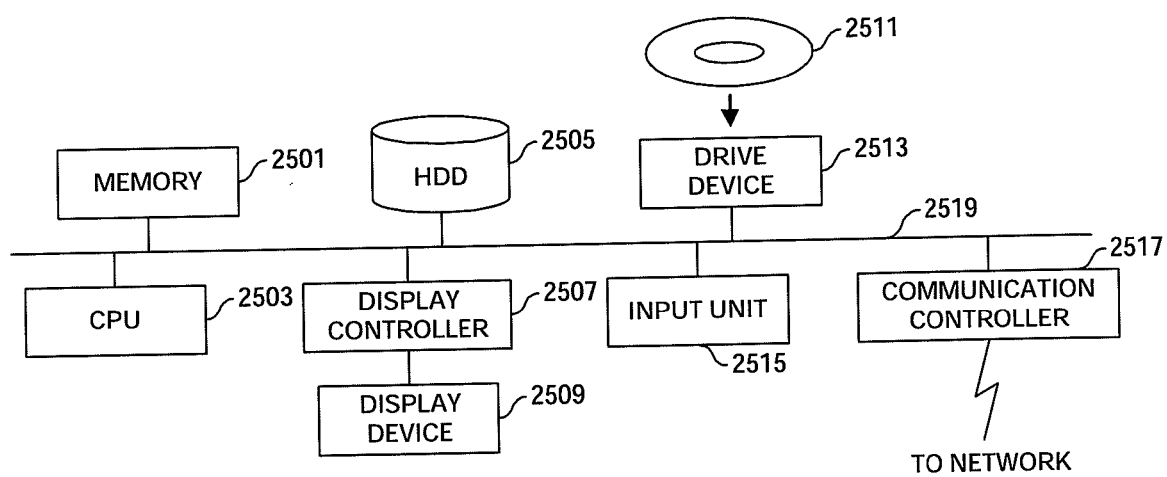
FIG. 36 is a functional block diagram of a computer.

Incidentally, the server 7, the applicant terminal 3 and the reader terminal 5 are computer devices as shown in FIG. 36. That is, a memory 2501 (storage device), a CPU 2503 (processor), a hard disk drive (HDD) 2505, a display controller 2507 connected to a display device 2509, a drive device 2513 for a removal disk 2511, an input device 2515, and a communication controller 2517 for connection with a network are connected through a bus 2519 as shown in FIG. 36. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this invention, the application program to realize the aforementioned functions is stored in the removal disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application program are systematically cooperated with each other, so that various functions as described above in details are realized.

What is claimed is:

1. A computer-readable, non-transitory medium which stores a program for causing a computer to execute a procedure for verifying scripts to generate display data, the procedure comprising:

first extracting an arithmetic instruction to process a numeric value in said financial data or a conversion instruction to convert a character string included in said financial data from scripts to generate display data from said financial data;

judging whether or not said arithmetic instruction or said conversion instruction extracted in said first extracting is an instruction that is a predetermined instruction prohibited from being used;

identifying a data item name of data at a specific position in display, based on an instruction, which is included in said scripts and determines a display format;

second extracting a display instruction to display data at said specific position from said scripts; and judging based on the extracted display instruction and said data item name identified in said identifying, whether or not said extracted display instruction is an instruction for making incorrect display;

third extracting a specific data item name and corresponding data corresponding to said specific data item name from said financial data;

searching said scripts for a certain instruction to obtain and display said corresponding data corresponding to said specific data item name, based on said specific data item name extracted in said third extracting; and judging from a search result representing presence of said certain instruction, whether or not said financial data is concealed.

2. The computer-readable, non-transitory medium according to claim 1, wherein said procedure further comprises:

searching said scripts for a second display instruction to display data, which is not included in said financial data, based on said specific data item name extracted in said third extracting; and judging from a search result representing presence of said second display instruction, whether or not said data, which is not included in said financial data, is redundantly displayed.

3. A method for verifying scripts to generate display data, the method comprising:

first extracting, by using a computer, an arithmetic instruction to process a numeric value in said financial data or a conversion instruction to convert a character string included in said financial data from scripts to generate display data from financial data;

judging, by using the computer, whether or not said arithmetic instruction or said conversion instruction extracted in said first extracting is an instruction that is a predetermined number prohibited from being used;

identifying, by using the computer, a data item name of data at a specific position in display, based on an instruction, which is included in said scripts and determines a display format;

second extracting, by using the computer, a display instruction to display data at said specific position from said scripts; and judging, by using the computer, based on the extracted display instruction and said data item name identified in said identifying, whether or not said extracted display instruction is an instruction for making incorrect display;

third extracting, by using the computer, a specific data item name and corresponding data corresponding to said specific data item name from said financial data:

searching, by using the computer, said scripts for a certain instruction to obtain and display said corresponding data corresponding to said specific data item name, based on said specific data item name extracted in said third extracting; and judging, by using the computer, from a search result representing presence of said certain instruction, whether or not said financial data is concealed.

4. An apparatus for verifying scripts to generate display data, the apparatus comprising:

a memory; and a processing unit using the memory and configured to execute a procedure:

first extracting an arithmetic instruction to process a numeric value in said financial data or a conversion instruction to convert a character string included in said financial data from scripts to generate display data from said financial data;

judging whether or not said arithmetic instruction or said conversion instruction extracted in said first extracting is an instruction that is a predetermined instruction prohibited from being used;

identifying a data item name of data at a specific position in display, based on an instruction, which is included in said scripts and determines a display format;

second extracting a display instruction to display data at said specific position from said scripts; and judging based on the extracted display instruction and said data item name identified in said identifying, whether or not said extracted display instruction is an instruction for making incorrect display;

third extracting a specific data item name and corresponding data corresponding to said specific data item name from said financial data;

searching said scripts for a certain instruction to obtain and display said corresponding data corresponding to said specific data item name, based on said specific data item name extracted in said third extracting; and judging from a search result representing presence of said certain instruction, whether or not said financial data is concealed

* * * * *